(12) United States Patent
Prasad et al.

(10) Patent No.: US 11,246,085 B2
(45) Date of Patent: Feb. 8, 2022

(54) COMMUNICATION TERMINAL, CORE NETWORK APPARATUS, COMMUNICATION SYSTEM, INFORMATION MANAGEMENT METHOD, AND COMPUTER READABLE MEDIUM

(71) Applicant: NEC Corporation, Tokyo (JP)

(72) Inventors: Anand Raghawa Prasad, Tokyo (JP); Sivakamy Lakshminarayanan, Chennai (IN); Sivabalan Arumugam, Chennai (IN); Hironori Ito, Tokyo (JP); Andreas Kunz, Hedelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/481,275

(22) PCT Filed: Jan. 26, 2018

(86) PCT No.: PCT/JP2018/002417
§ 371 (c)(1),
(2) Date: Jul. 26, 2019

(87) PCT Pub. No.: WO2018/139572
PCT Pub. Date: Aug. 2, 2018

(65) Prior Publication Data
US 2019/0394715 A1     Dec. 26, 2019

(30) Foreign Application Priority Data

Jan. 27, 2017  (IN) .............................. 201711003072

(51) Int. Cl.
*H04W 48/16* (2009.01)
*H04W 36/14* (2009.01)
(Continued)

(52) U.S. Cl.
CPC ........... *H04W 48/16* (2013.01); *H04W 36/14* (2013.01); *H04W 36/32* (2013.01); *H04W 8/205* (2013.01)

(58) Field of Classification Search
CPC ..... H04W 48/16; H04W 36/14; H04W 36/32; H04W 8/22
See application file for complete search history.

(56) References Cited

U.S. PATENT DOCUMENTS

2017/0303259 A1\* 10/2017 Lee ........................ H04W 28/16
2017/0332421 A1\* 11/2017 Sternberg ............ H04W 12/069
(Continued)

OTHER PUBLICATIONS

International Search Report dated Apr. 3, 2018, in the corresponding PCT International Application.
(Continued)

*Primary Examiner* — Jaime M Holliday

(57) ABSTRACT

An object is to provide a communication terminal capable of using a newly-generated network slice or service. A communication terminal (10) according to the present disclosure includes a communication unit (11) configured to receive a parameter related to SM-NSSAI (Session Management-Network Slice Selection Assistance Information) from a core network when subscriber information of the communication terminal itself managed in the core network or a location of the communication terminal itself is changed, and a control unit (12) configured to update NSSAI by using the parameter related to the SM-NSSAI, the NSSAI being managed to select a network slice.

10 Claims, 32 Drawing Sheets

(51) Int. Cl.
*H04W 36/32* (2009.01)
*H04W 8/20* (2009.01)

(56) References Cited

U.S. PATENT DOCUMENTS

| 2019/0223093 | A1* | 7/2019 | Watfa | H04W 48/18 |
| 2019/0261233 | A1* | 8/2019 | Duan | H04W 36/0066 |
| 2019/0364541 | A1* | 11/2019 | Ryu | H04W 76/25 |
| 2020/0059989 | A1* | 2/2020 | Velev | H04W 36/12 |

OTHER PUBLICATIONS

3GPP TR 23.799 V2.0.0 (Nov. 2016), "3$^{rd}$ Generation Partnership Project; Technical Specification Group Services and System Aspects; Study on Architecture for Next Generation System, (Release 14)", pp. 1-523, (Nov. 2016).
LG Electronics; "Interim Agreements on the Network Slice Reselection", SA WG2 Meeting (#118, S2-166474, pp. 1-7, (Nov. 2016).
CATT; "Slice Consideration Base on SA2 Agreement", 3GPP TSG RAN WG3 Meeting #Ad-hoc, R3-170142, pp. 1-3, (Jan. 2017).
Office Action dated Feb. 5, 2020, issued by the European Patent Office in counterpart European Patent Application No. 18 744 845.1.
Samsung: "RAN selection of Network slice and CN entity", 3GPP TSG-RAN WG3 #Ad-hoc, R3-170045, pp. 1-5, (Jan. 11, 2017).
Zte et al.: "Proposed alignments of Network Slicing Conclusion with 5G Core Overall Architecture", SA WG2, Meeting #118bis, S2-170168, pp. 1-8, (Jan. 10, 2017).
InterDigital et al.: "Modification of the Set of Selected Slices for a UE", SA WG2 Meeting #116bis, S2-164968, pp. 1-5, (Sep. 1, 2016).
ZTE: "Solution for UE access network and slices", 3GPP TSG SA WG3, S3-161460, pp. 1-4, (Oct. 5, 2016).

* cited by examiner

COMMUNICATION TERMINAL, CORE NETWORK APPARATUS, COMMUNICATION SYSTEM, INFORMATION MANAGEMENT METHOD, AND COMPUTER READABLE MEDIUM

CROSS-REFERENCE TO RELATED PATENT APPLICATIONS

This application is a National Stage Entry of International Application No. PCT/JP2018/002417, filed Jan. 26, 2018, which claims priority from Indian Patent Application No. 201711003072, filed Jan. 27, 2017. The entire contents of the above-referenced applications are expressly incorporated herein by reference.

TECHNICAL FIELD

The present disclosure relates to a communication terminal, a core network apparatus, a communication system, an information management method, and a program.

BACKGROUND ART

A network slice is a collection of logical network functions and a collection of resources for implementing a communication service in a certain use case. Network slicing is a process for dividing one physical network into a plurality of slices.

Non-patent Literature 1 discloses a process in which a UE (User Equipment) uses NSSAI (Network Slice Selection Assistance Information). Specifically, it discloses that the UE selects Network Slice Instances (NSIs). NSSAI includes a plurality of parameters. The NSSAI is set in the LIE in advance.

Further, the NSSAI is a collection of SM-NSSAIs (Session Management-NSSAIs). The SM-NSSAI further includes an SST (Slice/Service type) and an SD (Slice Differentiator).

The SST indicates features of a network slice and behavior of a network related to a service provided by the network slice. The SD is information that complements the SST that is used when a network slice instance is selected.

CITATION LIST

Non Patent Literature

SUMMARY OF INVENTION

Technical Problem

NSSAI that is used when a network slice is selected is set in a UE in advance. Therefore, even if a new network slice or a new service available to the UE is generated, the NSSAI held in the UE is not updated. Therefore, there is a problem that the UE cannot use the newly-generated network slice or service.

In view of the above-described problem, an object of the present disclosure is to provide a communication terminal, an information management method, and a program capable of using a newly-generated network slice or service. Further, another object of the present disclosure is to provide a core network apparatus and a communication system capable of enabling a UE to use a newly-generated network slice or service.

Solution to Problem

A communication terminal according to a first aspect of the present disclosure includes: a communication unit configured to receive a parameter related to SM-NSSAI (Session Management-Network Slice Selection Assistance Information) from a core network when subscriber information of the communication terminal itself managed in the core network or a location of the communication terminal itself is changed; and a control unit configured to update NSSAI by using the parameter related to the SM-NSSAI, the NSSAI being managed to select a network slice.

A core network apparatus according to a second aspect of the present disclosure includes: a communication unit configured to receive a parameter related to SM-NSSAI (Session Management-Network Slice Selection Assistance Information) from a subscriber information management apparatus when subscriber information of a communication terminal managed in the subscriber information management apparatus or a location of the communication terminal is changed; and a control unit configured to update NSSAI by using information related to the SM-NSSAI, the NSSAI being managed to select a network slice used by the communication terminal.

A communication system according to a third aspect of the present disclosure includes: a subscriber information management apparatus configured to send a parameter related to SM-NSSAI (Session Management-Network Slice Selection Assistance Information) to a communication terminal when subscriber information of the communication terminal or a location of the communication terminal is changed; and the communication terminal configured to receive the parameter related to the SM-NSSAI and update NSSAI by using the parameter related to the SM-NSSAI, the NSSAI being managed to select a network slice.

An information management method for a communication terminal according to a fourth aspect of the present disclosure includes: receiving a parameter related to SM-NSSAI (Session Management-Network Slice Selection Assistance Information) from a core network when subscriber information of the communication terminal managed in the core network or a location of the communication terminal is changed; and updating NSSAI by using the parameter related to the SM-NSSAI, the NSSAI being managed to select a network slice.

A program according to a fifth aspect of the present disclosure causes a computer to: receive a parameter related to SM-NSSAI (Session Management-Network Slice Selection Assistance Information) from a core network when subscriber information of the communication terminal managed in the core network or a location of the communication terminal is changed; and update NSSAI by using the parameter related to the SM-NSSAI, the NSSAI being managed to select a network slice.

Advantageous Effects of Invention

According to the present disclosure, it is possible to provide a communication terminal, an information management method, and a program capable of using a newly-generated network slice or service. Further, it is possible to provide a core network apparatus and a communication system capable of enabling a UE to use a newly-generated network slice or service.

DESCRIPTION OF EMBODIMENTS

First Example Embodiment

Figure 1:
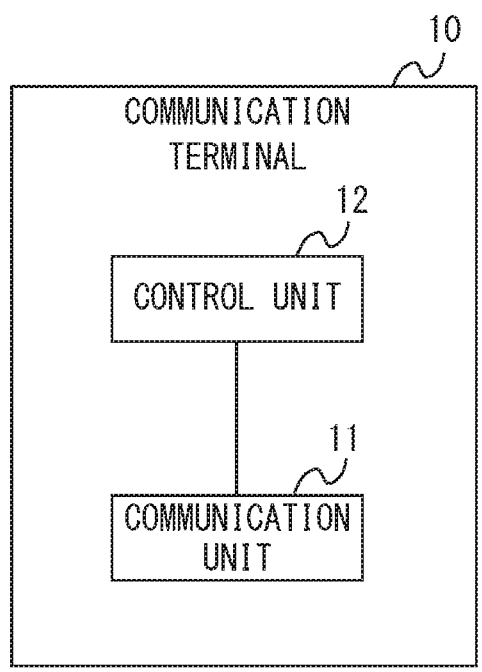
FIG. 1 is a configuration diagram of a communication terminal according to a first example embodiment.

Example embodiments according to the present disclosure will be described hereinafter with reference to the drawings. Firstly, a configuration example of a communication terminal 10 according to a first example embodiment is described with reference to FIG. 1. The communication terminal 10 may be a computer apparatus that operates as a processor executes a program stored in a memory. The communication terminal 10 may be, for example, a mobile phone terminal, a smartphone terminal, or a tablet terminal. Further, the communication terminal 10 may be an IoT (Internet of Things) terminal or an MTC (Machine Type Communication) terminal.

The communication terminal 10 includes a communication unit 11 and a control unit 12. The communication unit 11 and the control unit 12 may be software or a module(s) by which processing is performed as a processor executes a program stored in a memory. Alternatively, the communication unit 11 and the control unit 12 may be hardware such as a circuit or a semiconductor chip.

The communication unit 11 receives a parameter related to SM-NSSAI (Session Management-Network Slice Selection Assistance Information). For example, the communication unit 11 receives a parameter related to SM-NSSAI from a core network when subscriber information of the communication terminal 10 managed in the core network or the location of the communication terminal 10 is changed.

The parameter related to the SM-NSSAI may include, for example, information identifying the SM-NSSAI. Alternatively, the parameter related to the SM-NSSAI may include an SST (Slice/Service type) or an SD (Slice Differentiator). The parameter related to the SM-NSSAI is updated or changed when the subscriber information of the communication terminal 10 managed in the core network or the location of the communication terminal 10 is changed.

For example, when the communication terminal 10 requests provision of a service using a new network slice, a parameter related to the SM-NSSAI of the communication terminal 10 is changed. Further, there are cases in which when the communication terminal 10 moves, a network slice provided in the destination area s different from one provided in the original area. In such cases, the parameter related to the SM-NSSAI of the communication terminal 10 is changed.

The control unit 12 updates NSSAI, which is managed to select a network slice, by using the parameter related to the SM-NSSAI. The NSSAI is a collection of SM-NSSAIs. The SM-NSSAI further includes an SST and an SD. Therefore, when at least one of the identification information, the SST, and the SD of the SM-NSSAI is changed, information about the NSSAI managed in the communication terminal 10 is also changed. Further, the communication terminal 10 performs an information management method. Specifically, the communication terminal 10 receives the parameter related to the SM-NSSAI from the core network when the subscriber information of the communication terminal 10 managed in the core network or the location of the communication terminal 10 is changed. Next, the communication terminal 10 updates NSSAI, which is managed to select a network slice, by using the parameter related to the SM-NSSAI.

As described above, the communication terminal 10 can receive the SM-NSSAI from the core network side when the SM-NSSAI is changed. In this way, the communication terminal 10 can update or change the information about the NSSAI held in the communication terminal 10.

Second Example Embodiment

Next, a flow of an NSSAI updating process performed in a communication system defined in the 3GPP will be described with reference to FIGS. 2 and 3. Further, in FIG. 2 and the subsequent figures, processes that are performed in a communication system including a UE 20 and an NG (Next Generation) (R)AN ((Radio) Access Network) 21 will be described. Further, in FIG. 2 and the subsequent figures, processes that are performed in an AMF (Access and Mobility Management Function) entity 22 will be described. Further, in FIG. 2 and the subsequent figures, processes that are performed in a communication system including a UDM (Unified Data Management) entity 23 will be described. Further, in FIG. 2 and the subsequent figures, processes that are performed in a communication system including a PCF (Policy Control Function) entity 24 will be described. The AMF entity 22 is hereinafter referred to as an AMF 22. The UDM entity 23 is hereinafter referred to as a UDM 23. The PCF entity 24 is hereinafter referred to as a PCF 24.

The AMF 22, the UDM 23, and the PCF 24 constitute a core network. The AMF 22, the UDM 23, and the PCF 24 may be referred to as core network apparatuses. The UE 20, the NG (R)AN 21, the AMF 22, the UDM 23, and the PCF 24 may be a computer apparatus(es) that operates as a processor executes a program stored in a memory.

The term UE 20 is used as a general term for communication terminals in the 3GPP. The NG (R)AN 21 represents, for example, a next-generation access network called 5G. Alternatively, the NG (R)AN 21 may be a communication apparatus disposed in an access network, for example, an apparatus provided in a base station. The NG (R)AN 21 may be a radio access network or an access network using point-to-point communication.

The AMF 22 performs mobility management for the UE 20. Further, the AMF 22 cooperates with the UDM 23 or the PCF 24 and performs a verification process for the UE 20. The UDM 23 manages subscriber data of the UE 20. The PCF 24 manages policy information in the communication system. The UDM 23 may be referred to as a subscriber information management apparatus. The subscriber information management apparatus may include the UDM 23 and a UDR (User Data Repository). The UDR stores subscriber information of the UE 20.

Figure 2:
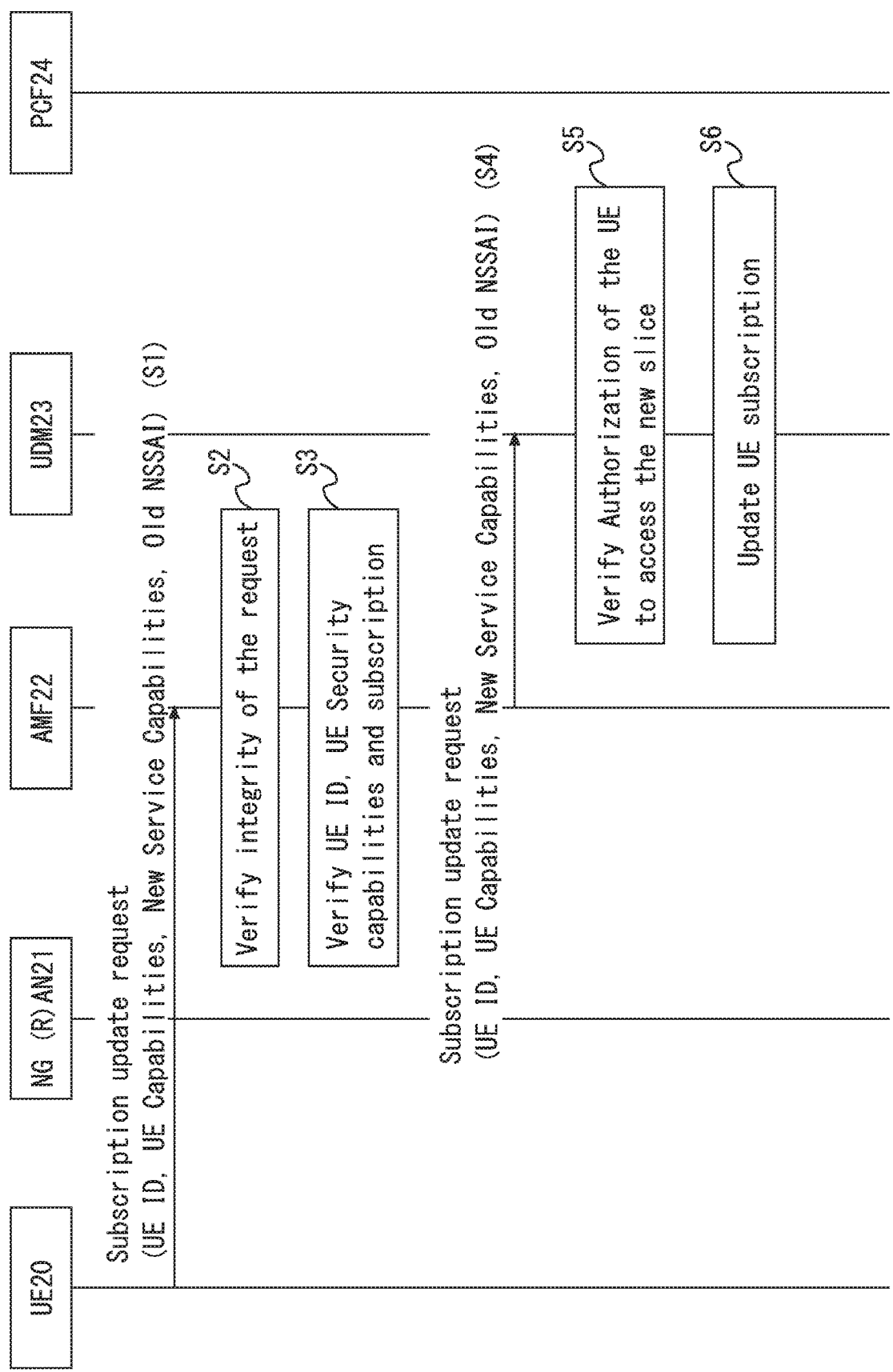
FIG. 2 shows a flow of an NSSAI updating process according to a second example embodiment.
Figure 3:
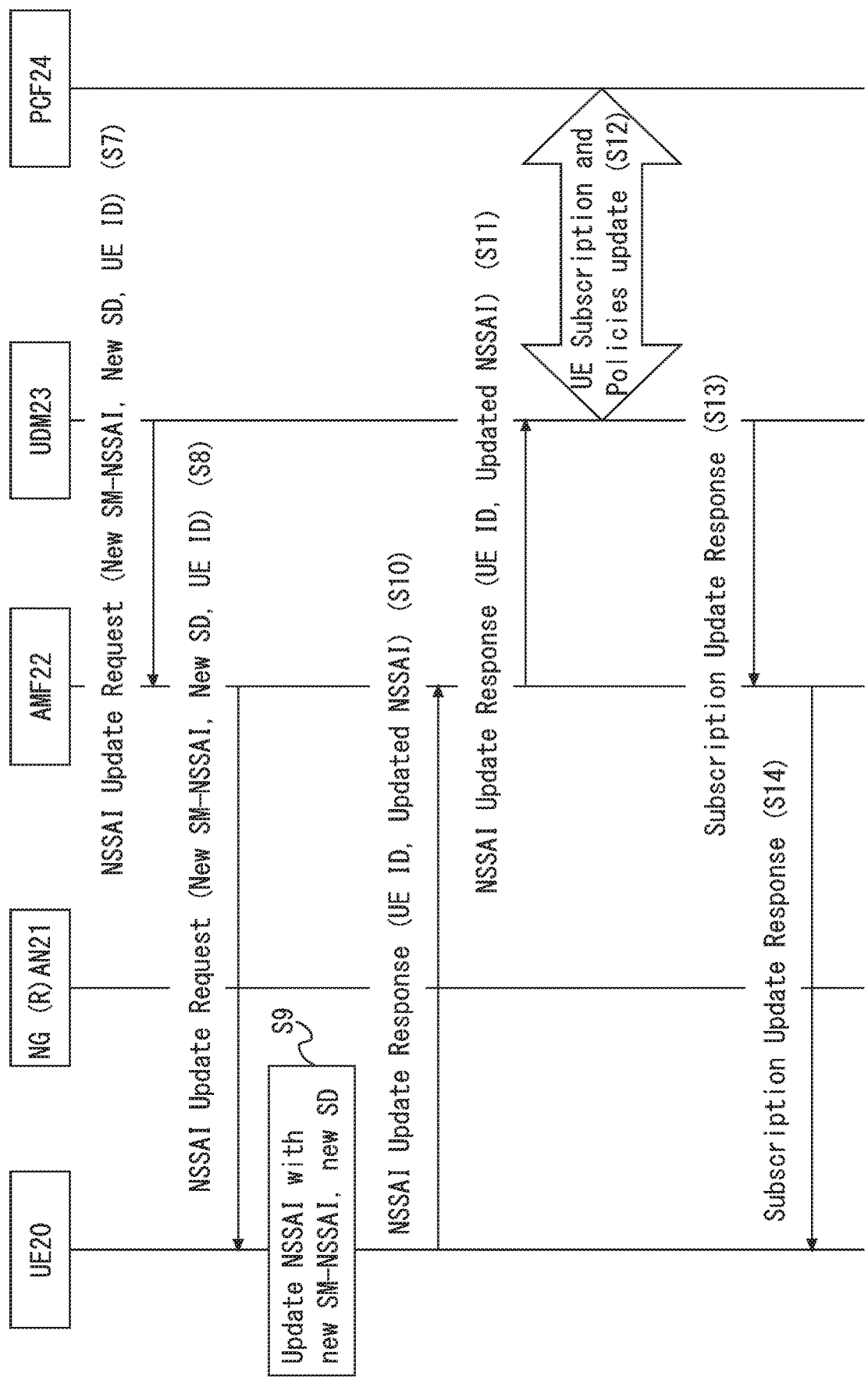
FIG. 3 shows a flow of an NSSAI updating process according to the second example embodiment.

FIGS. 2 and 3 show a flow of a process for updating information about a network slices in the UE 20. The information about the network slice may be, for example, NSSAI.

Firstly, the UE 20 sends a Subscription update request message to the AMF 22 (S1). The Subscription update request message is a request message for requesting a change or an update of the subscriber information of the UE 20. Subscription update request message includes a UE ID, UE Capabilities, New Service Capabilities, and Old NSSAI. The UE ID is information for identifying the UE 20. The UE ID may be, for example, an IMSI (International Mobile Subscriber Identity), a TMSI (Temporary Mobile Subscriber Identity), a GUTI (Globally Unique Temporary Identifier), or a Temp ID. The UE Capabilities may be, for example, information indicating information about an algorithm used for encryption and integrity assurance performed in the UE 20. Further, the UE Capabilities may include information indicating whether the UE 20 is a single radio supporting one radio frequency band or a dual radio supporting two radio frequency bands. Further, the UE Capabilities may include information indicating whether the UE is a low-cost device, a fixed terminal, or a terminal under a battery constraint. The information indicating the information about the algorithm used for the encryption and the integrity assurance performed in the UE 20 may be referred to as, for example, UE Security Capabilities.

The New Service Capabilities may include information about a service requested by the UE 20. The information about the service may be, for example, information about service contents, service specifications, etc.

The Old NSSAI is information about NSSAI currently managed by the UE 20. The Old NSSAI may be, for example, information identifying the NSSAI.

Next, the AMF 22 verifies integrity of the request message (S2). Next, the AMF 22 verifies the UE ID, the UE Security capabilities, and the subscriber information (S3). The AMF 22 may verify the UE capabilities including the UE Security capabilities.

Next, the AMF 22 sends a Subscription Update request message to the UDM 23 (S4). The UDM 23 determines whether or not the UE 20 can access to a newly generated (subscribed) network slice (S5). Next, when the UE 20 can access to the newly generated network slice, the UDM 23 updates the subscriber information of the UE 20 (S6). For example, the UDM 23 updates the SM-NSSAI and the SD associated with the UE 20.

Next, the UDM 23 sends an NSSAI Update Request message to the AMF 22 (S7). The NSSAI Update Request message includes New SM-NSSAI, a New SD, and the UE ID. The New SM-NSSAI and the New SD indicate the updated SM-NSSAI and the updated SD.

Next, the AMF 22 forwards the NSSAI Update Request message received from the UDM 23 to the UE 20 (S8).

Next, the UE 20 updates the NSSAI held in the UE 20 by using the New SM-NSSAI and the New SD (S9). That is, the UE 20 updates the Old NSSAI by using the New SM-NSSAI and the New SD. Next, the UE 20 sends an NSSAI Update Response message to the AMF 22 (S10). The NSSAI Update Response message includes the UE ID and the updated NSSAI. Next, the AMF 22 forwards the NSSAI Update Response message received from the UE 20 to the UDM 23 (S11).

Next, the UDM 23 interacts with the PCF 24 in order to update the subscriber information of the UE 20 and the policy information for the UE 20. The UDM 23 communicates with the PCF 24 via a User Data Repository (UDR). For example, the UDM 23 extracts the subscriber information of the UE 20 from the UDR and sends the extracted subscriber information to the PCF 24.

Next, the UDM 23 sends a Subscription Update Response message to the AMF 22 (S13). Next, the AMF 22 forwards the Subscription Update Response message received from the UDM 23 to the UE 20 (S14).

Figure 4:
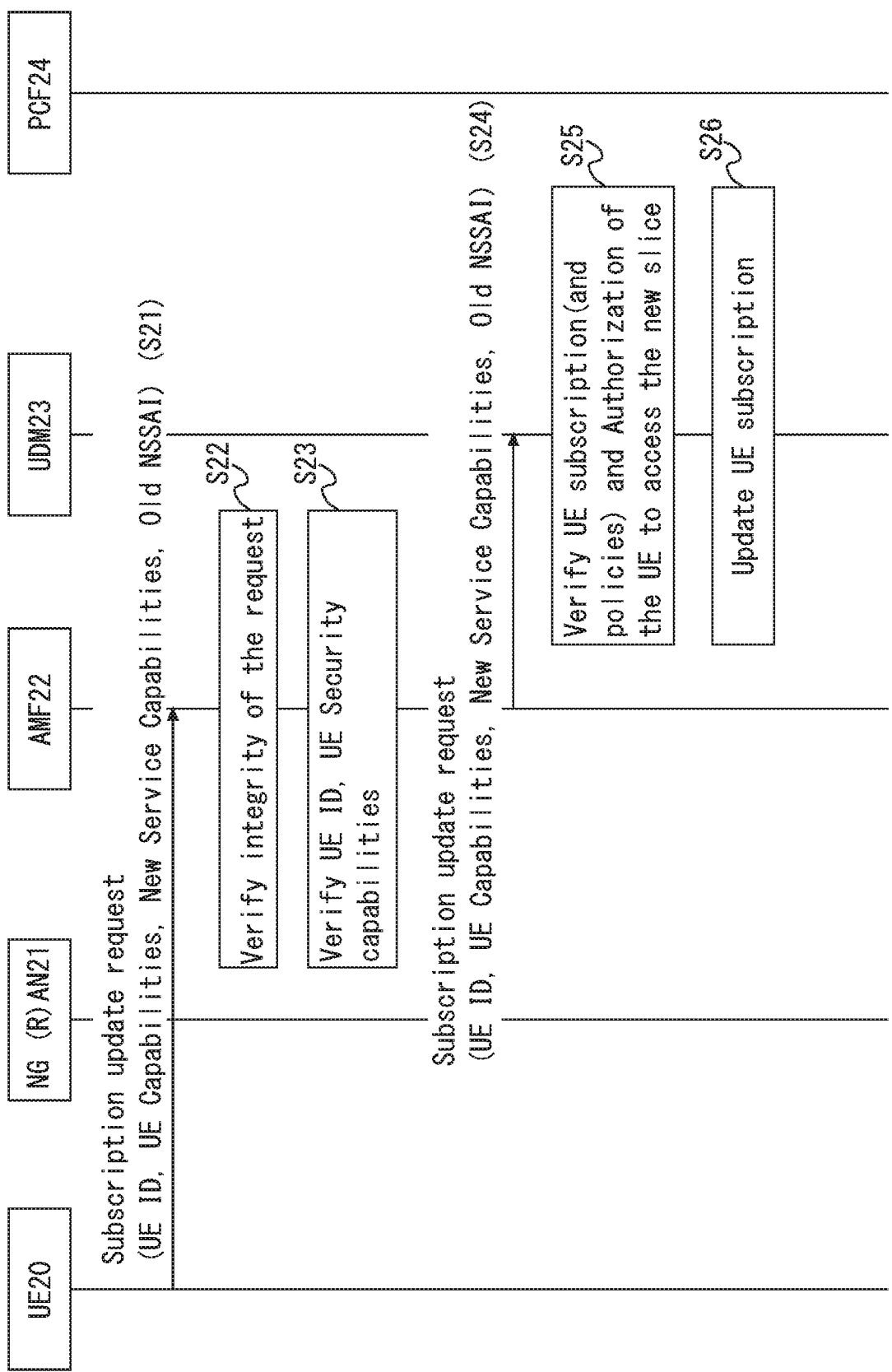
FIG. 4 shows a flow of an NSSAI updating process according to the second example embodiment.
Figure 5:
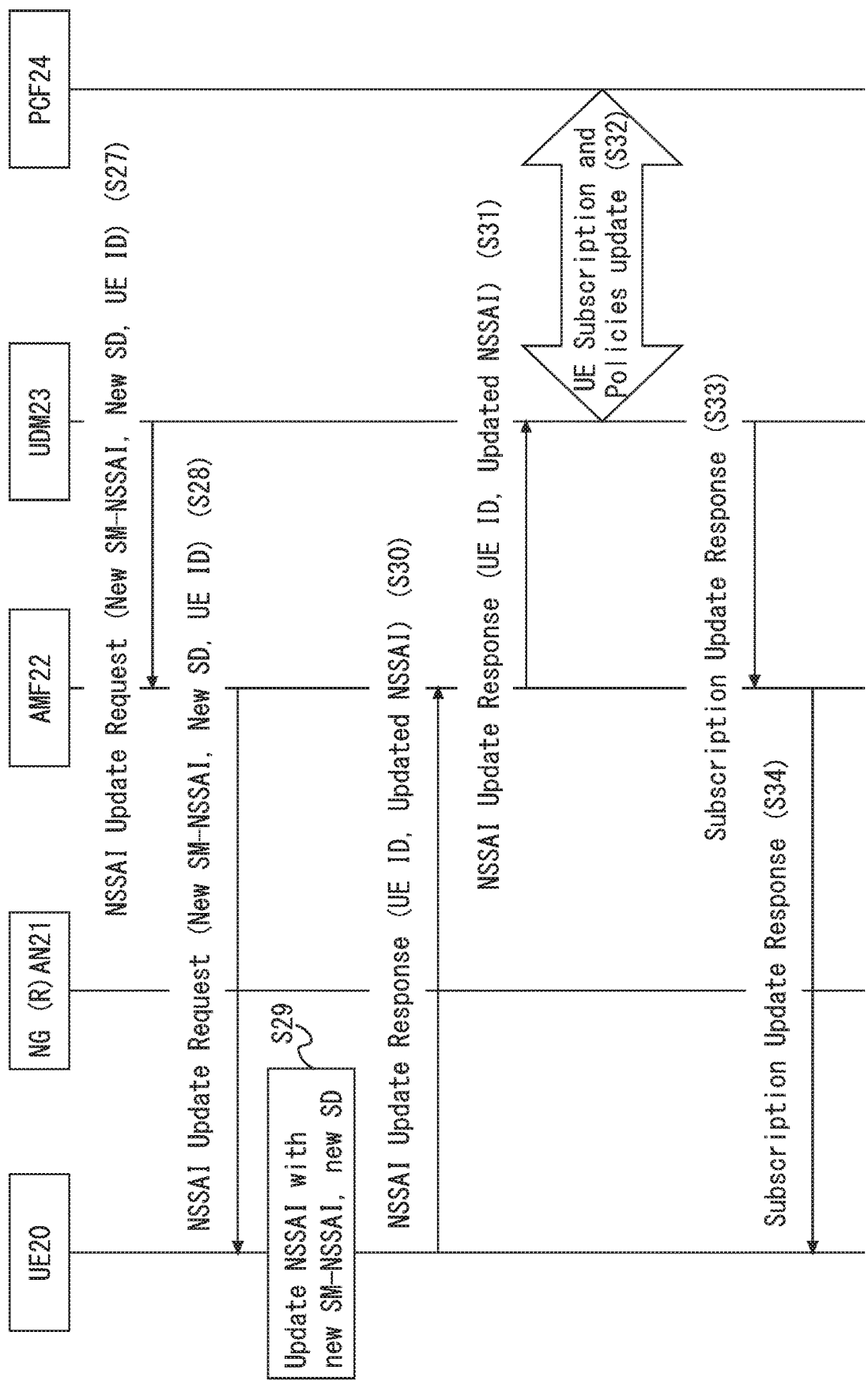
FIG. 5 shows a flow of an NSSAI updating process according to the second example embodiment.

Next, a flow of an NSSAI updating process different from the one shown in FIGS. 2 and 3 is described with reference to FIGS. 4 and 5. In FIG. 4, the AMF 22 does not verify subscriber information of the UE 20 in a step S23 and the UDM 23 verifies the subscriber information of the UE 20 in a step S25. The other steps are similar to the steps S1 to S14 in FIGS. 2 and 3, and therefore detailed descriptions thereof are omitted.

Next, another flow of an NSSAI updating process different from the one shown in FIGS. 2 and 3 is described with reference to FIGS. 6 and 7. In FIG. 7, in a step S47, the UDM 23 sends an NSSAI Update Request message including an SST and a New SD to the AMF 22. That is, in a step S46, the UDM 23 updates the SD as the subscriber information of the UE 20.

Further, in a step S48, the AMF 22 forwards the NSSAI Update Request message received from the UDM 23 to the UE 20. In a step S49, the UE 20 updates the NSSAI held in the UE 20 by using the New SD. That is, the UE 20 updates the NSSAI by using the New SD instead of using the New SM-NSSAI. The other steps are similar to the steps S1 to S14 in FIGS. 2 and 3, and therefore detailed descriptions thereof are omitted.

Figure 6:
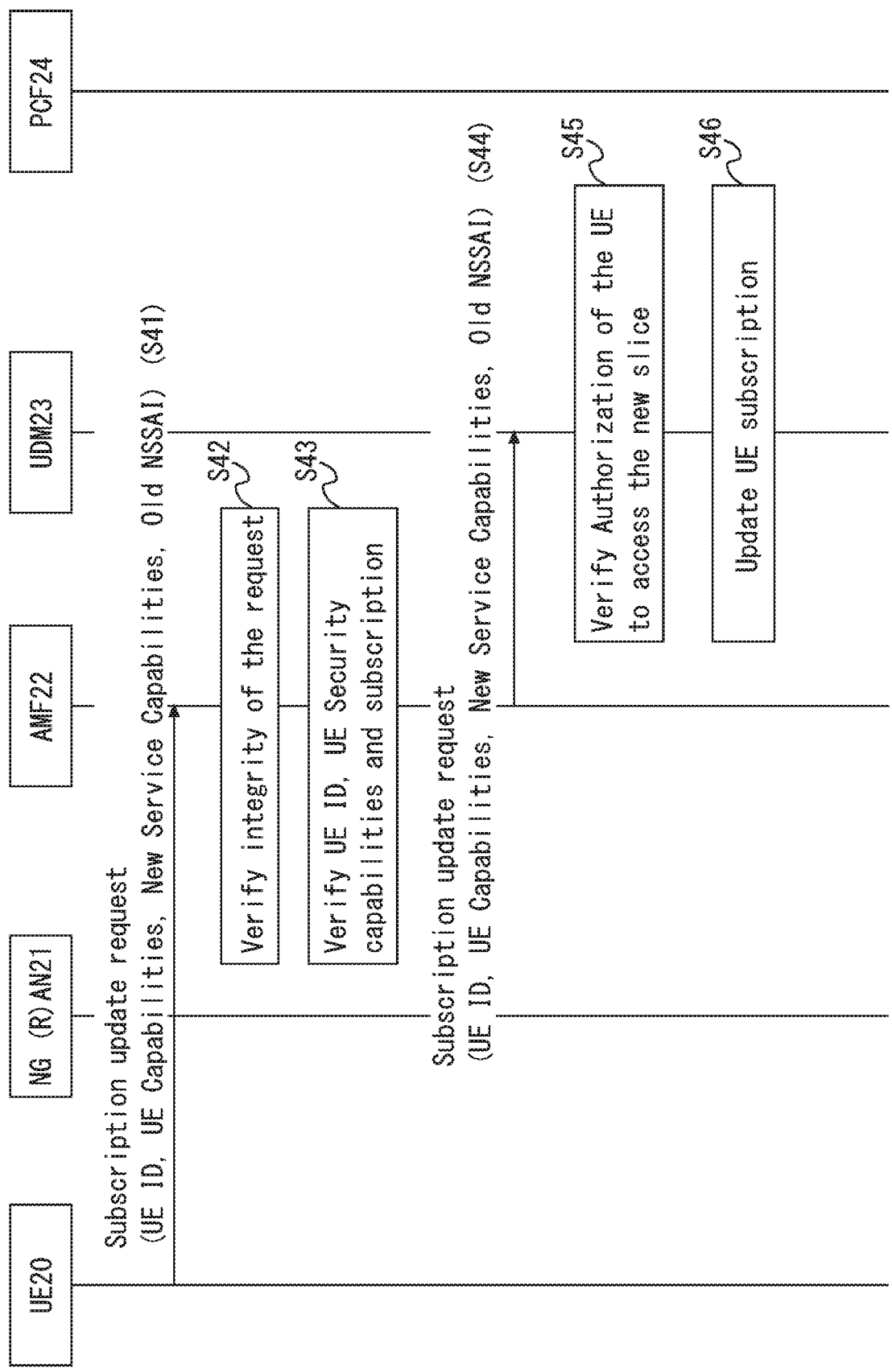
FIG. 6 shows a flow of an NSSAI updating process according to the second example embodiment.
Figure 7:
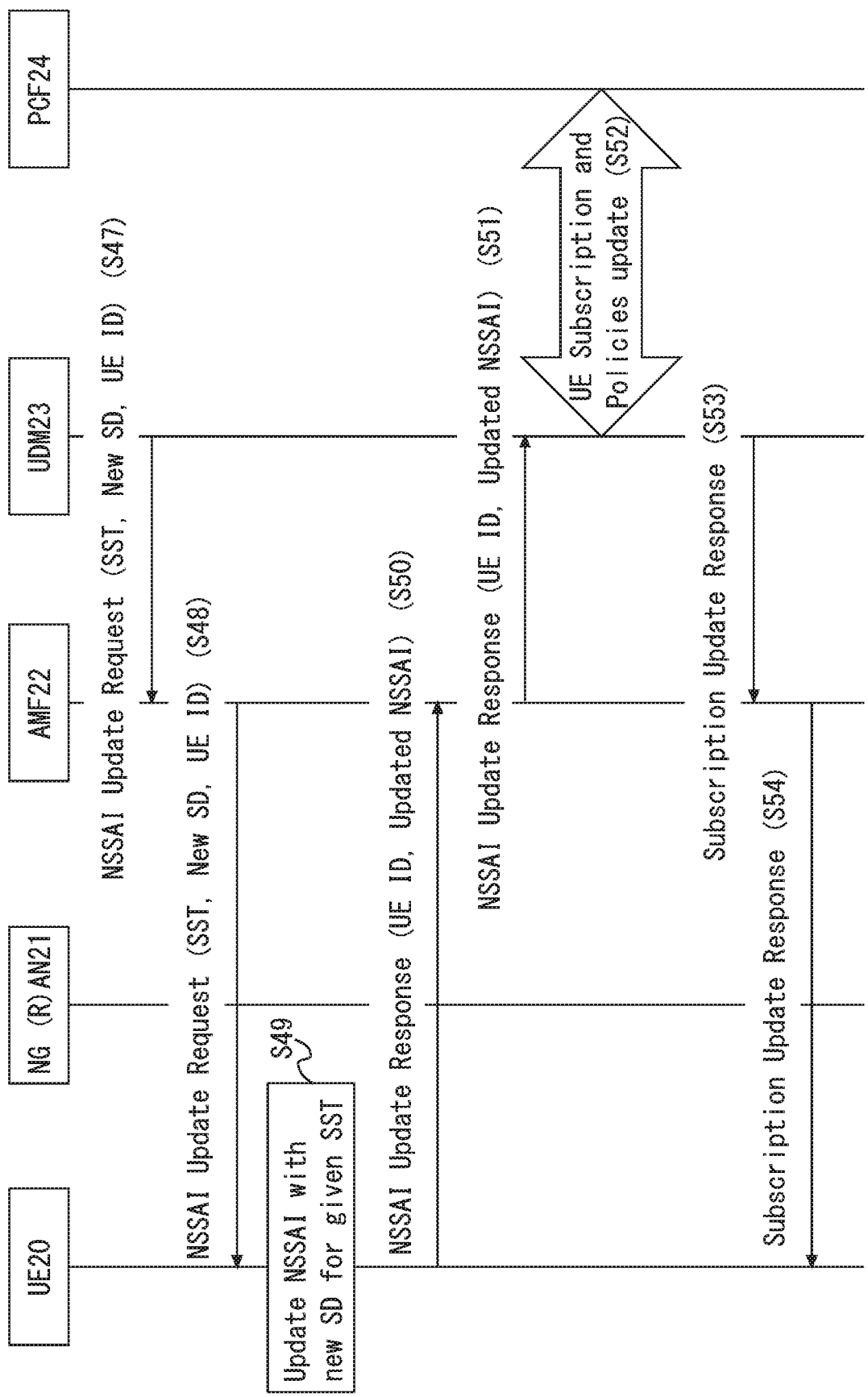
FIG. 7 shows a flow of an NSSAI updating process according to the second example embodiment.
Figure 8:
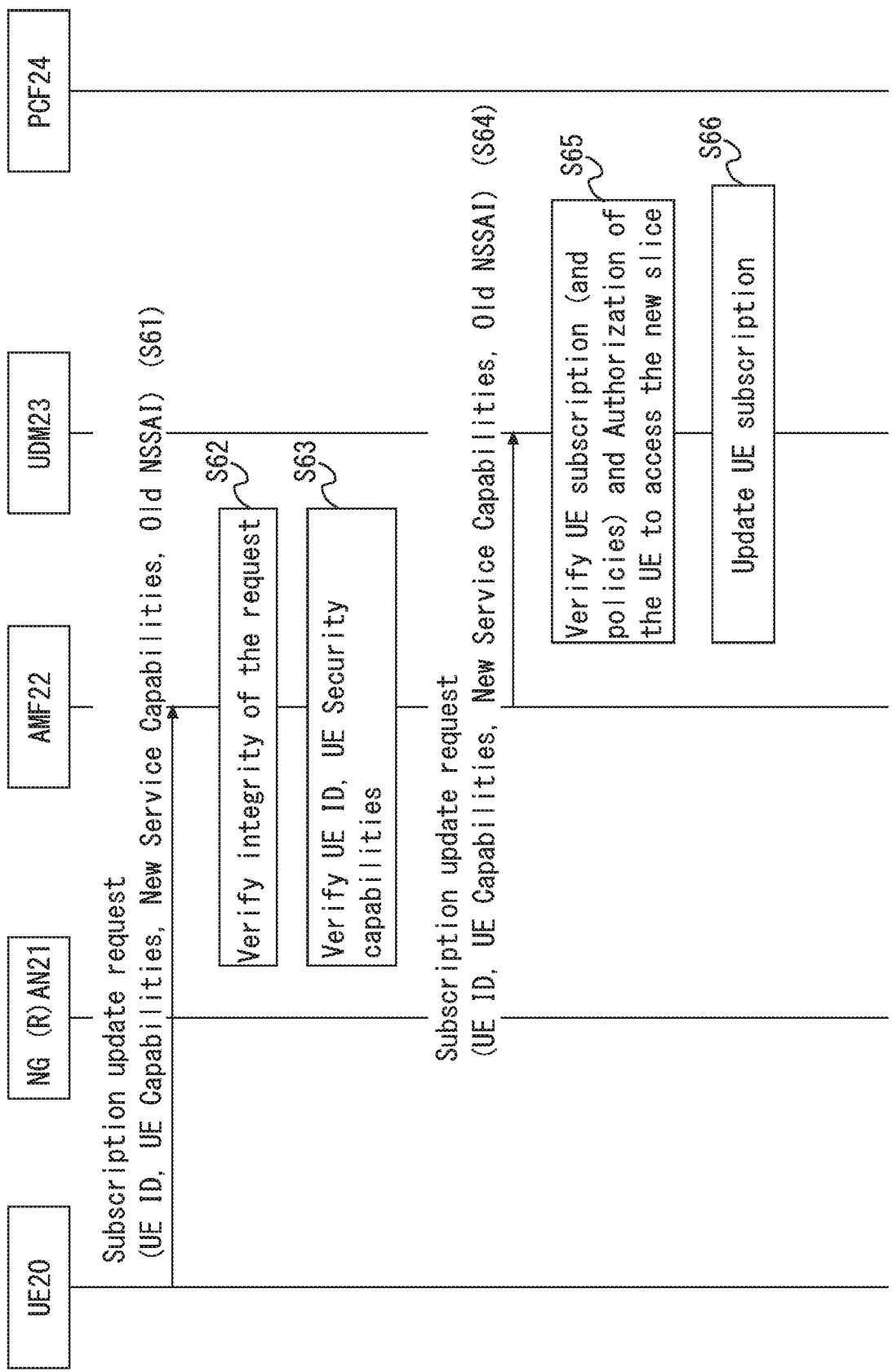
FIG. 8 shows a flow of an NSSAI updating process according to the second example embodiment.
Figure 9:
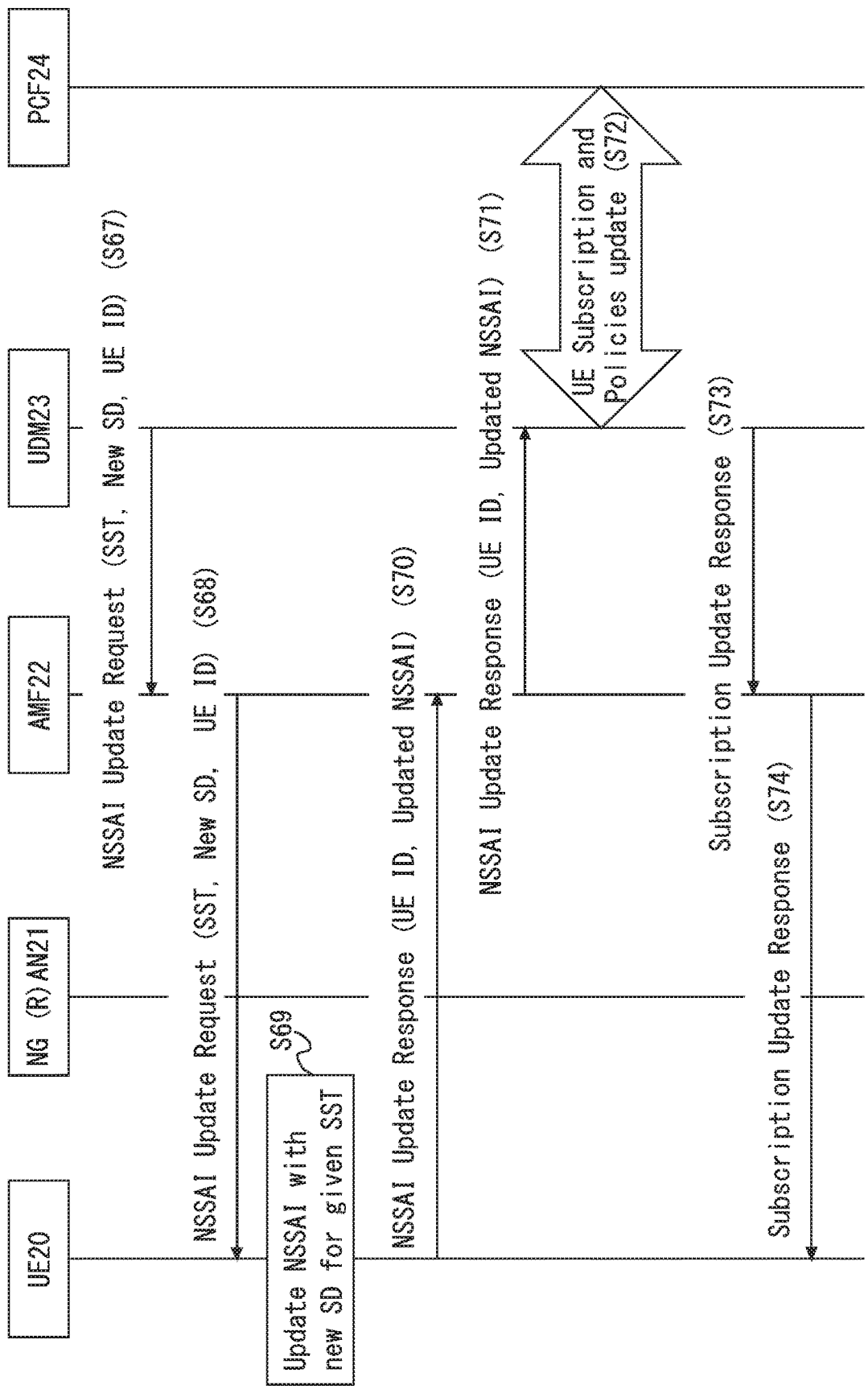
FIG. 9 shows the flow of an NSSAI updating process according to the second example embodiment.

Next, a flow of an NSSAI updating process different from the one shown in FIGS. 6 and 7 is described with reference to FIGS. 8 and 9. In FIG. 8, the AMF 22 does not verify subscriber information of the UE 20 in a step S63 and the UDM 23 verifies the subscriber information of the UE 20 in a step S65. The other steps are similar to the steps S41 to S54 in FIGS. 6 and 7, and therefore detailed descriptions thereof are omitted.

As described above, the UP 20 can receive at least one of the New SM-NSSAI and the New SD from the AMF 22 by performing the processes shown in FIGS. 2 to 9. As a result, the UE 20 can update the NSSAI held in the UE 20 (i.e., the Old NSSAI).

Third Example Embodiment

Figure 10:
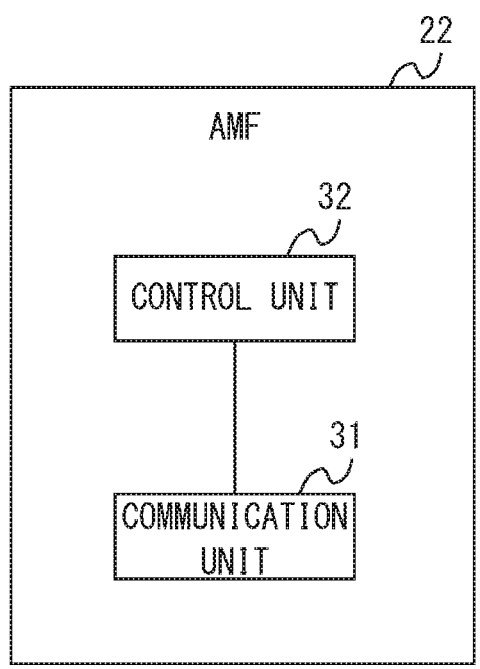
FIG. 10 is a configuration diagram of an AMF according to a third example embodiment.

Next, a configuration example of the AMF 22 according to a third example embodiment is described with reference to FIG. 10. The AMF 22 includes a communication unit 31 and a control unit 32. The communication unit 31 and the control unit 32 may be software or a module(s) by which processing is performed as a processor executes a program stored in a memory. Alternatively, the communication unit 31 and the control unit 32 may be hardware such as a circuit a semiconductor chip.

The communication unit 31 receives a parameter related to SM-NSSAI associated with the UE 20 from the UDM 23. For example, the communication unit 31 receives the parameter related to the SM-NSSAI associated with the UE 20 from the UDM 23 when the subscriber information of the UE 20 managed in the UDM 23 or the location of the UE 20 is changed.

The control unit 32 updates NSSAI that is used when a network s ice used by the UE 20 is selected.

Next, a flow of an NSSAI updating process is described with reference to FIGS. 11 and 12. Steps S81 to S87 are similar to the steps S1 to S7 in FIG. 2, and therefore detailed descriptions thereof are omitted.

Figure 12:
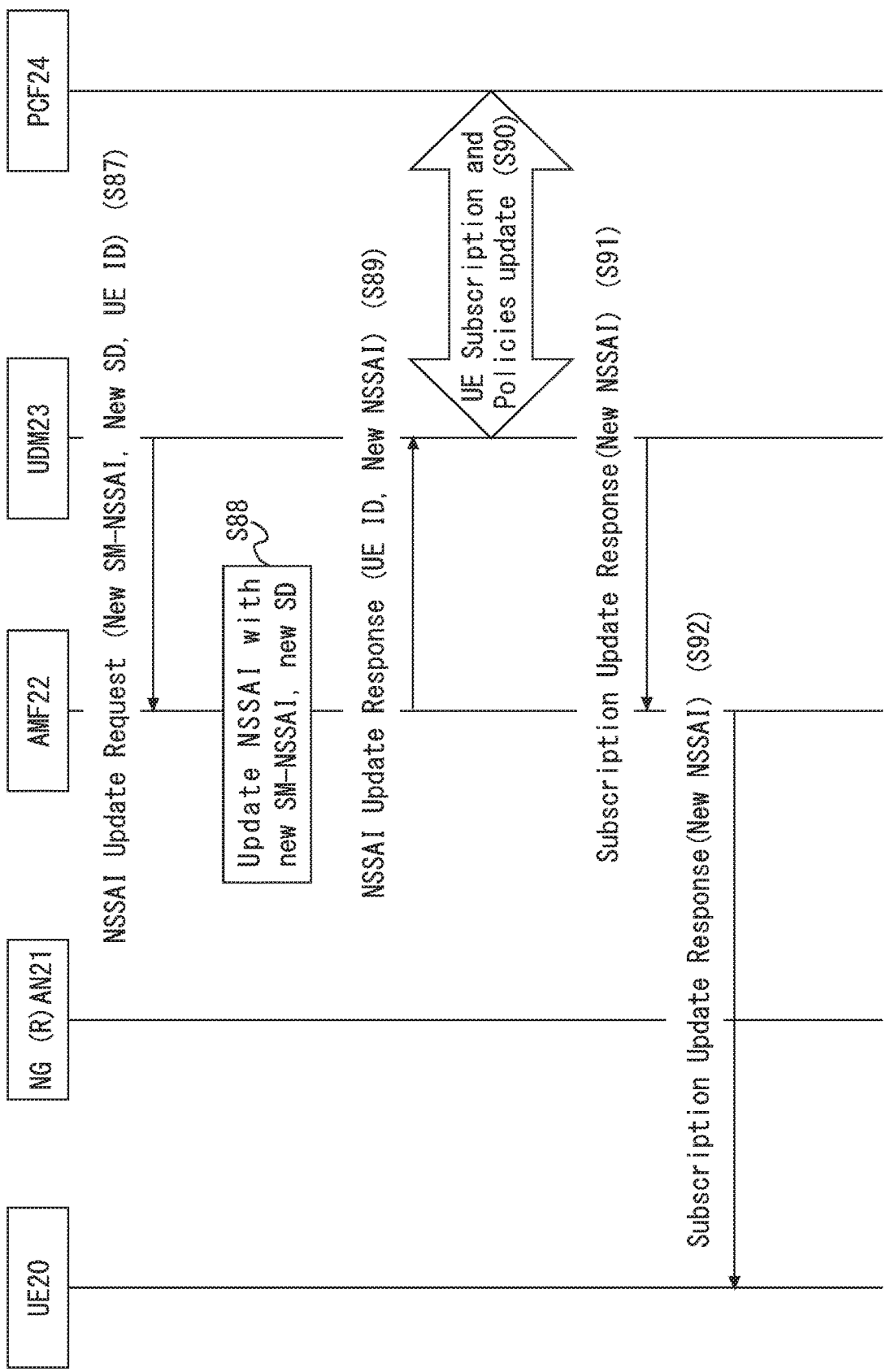
FIG. 12 shows a flow of an NSSAI updating process according to the third example embodiment.

In FIG. 12, in a step S87, the AMF 22 receives a UE ID of the UE 20, and a New SM-NSSAI and a New SD associated with the UE 20. Next, in a step S88, the AMF 22 updates NSSAI associated with the UE 20 held in the AMF 22 by using the New SM-NSSAI and the New SD associated with the UE 20.

Steps S89 and S90 in FIG. 12 are similar to the steps S11 and S12 in FIG. 3, and therefore detailed descriptions thereof are omitted.

In FIG. 12, in a step S91, the UDM 23 sends a Subscription Update Response message including New NSSAI to the AMF 22. Further, in a step S92, the AMF 22 sends the Subscription Update Response message including the New NSSAI.

Further, if the UDM 23 has updated the NSSAI, which is held in association with the UE 20, after the step S86, the steps S87 to S89 may be skipped.

Figure 11:
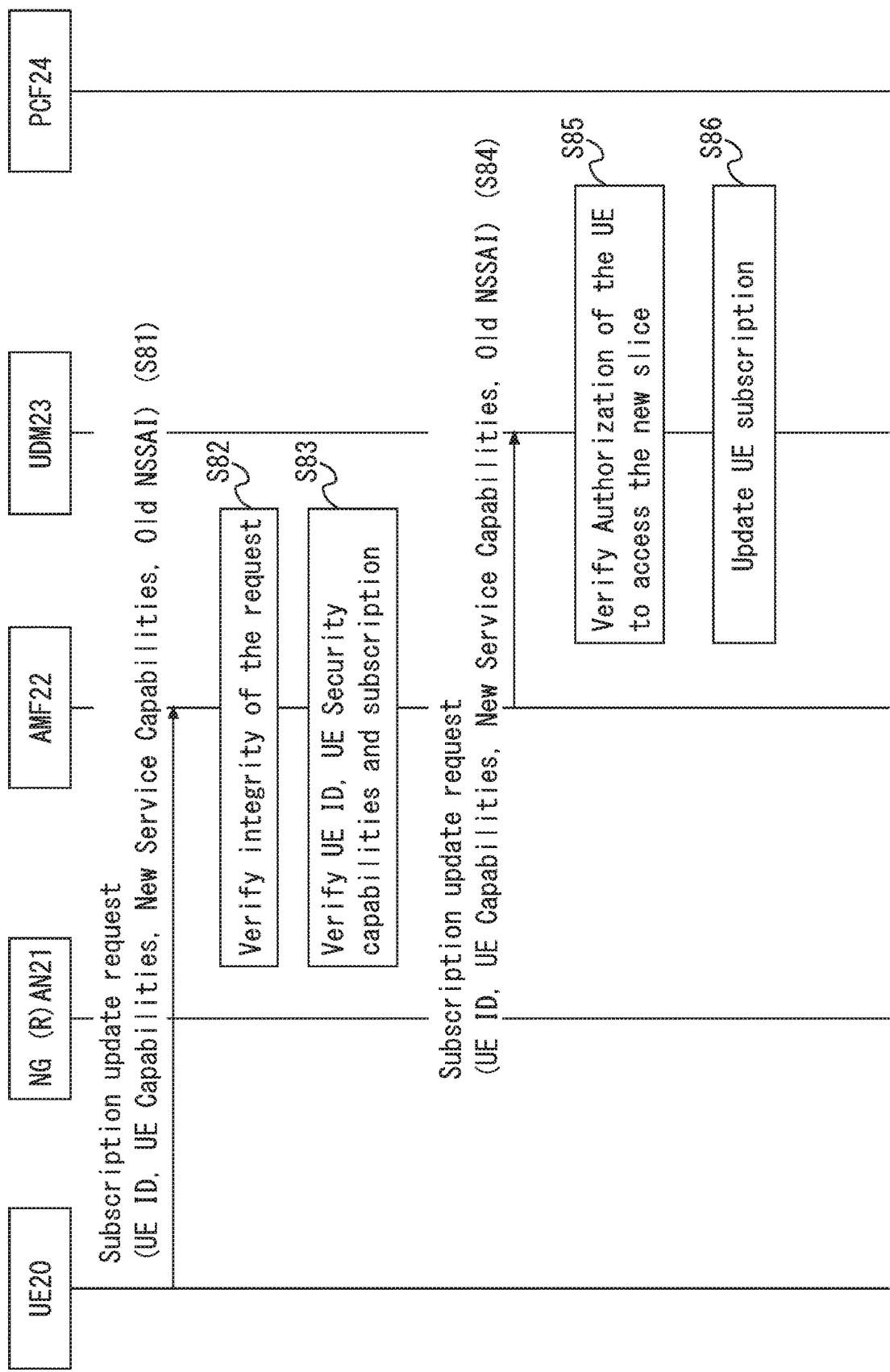
FIG. 11 shows a flow of an NSSAI updating process according to the third example embodiment.
Figure 13:
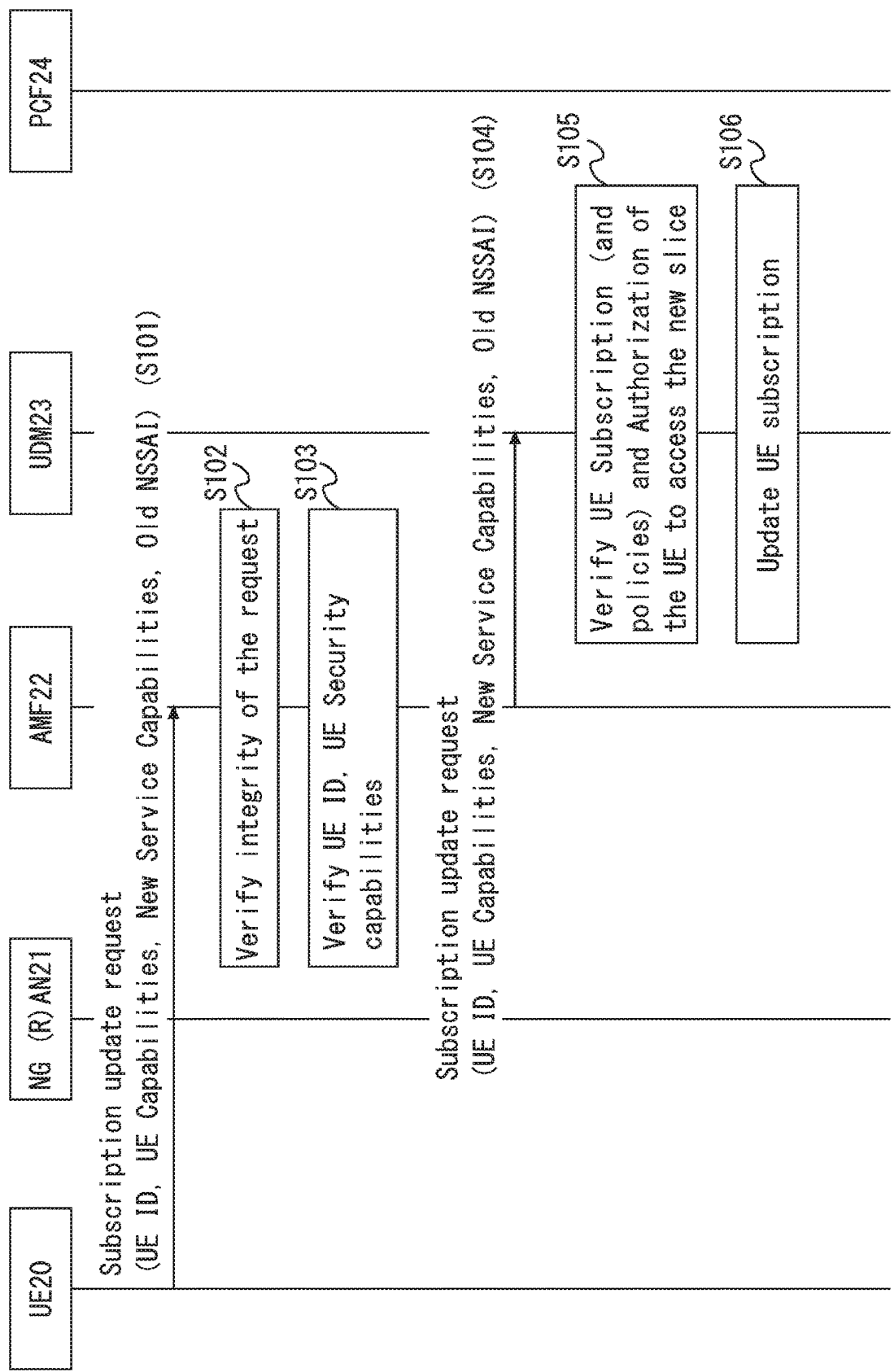
FIG. 13 shows a flow of an NSSAI updating process according to the third example embodiment.
Figure 14:
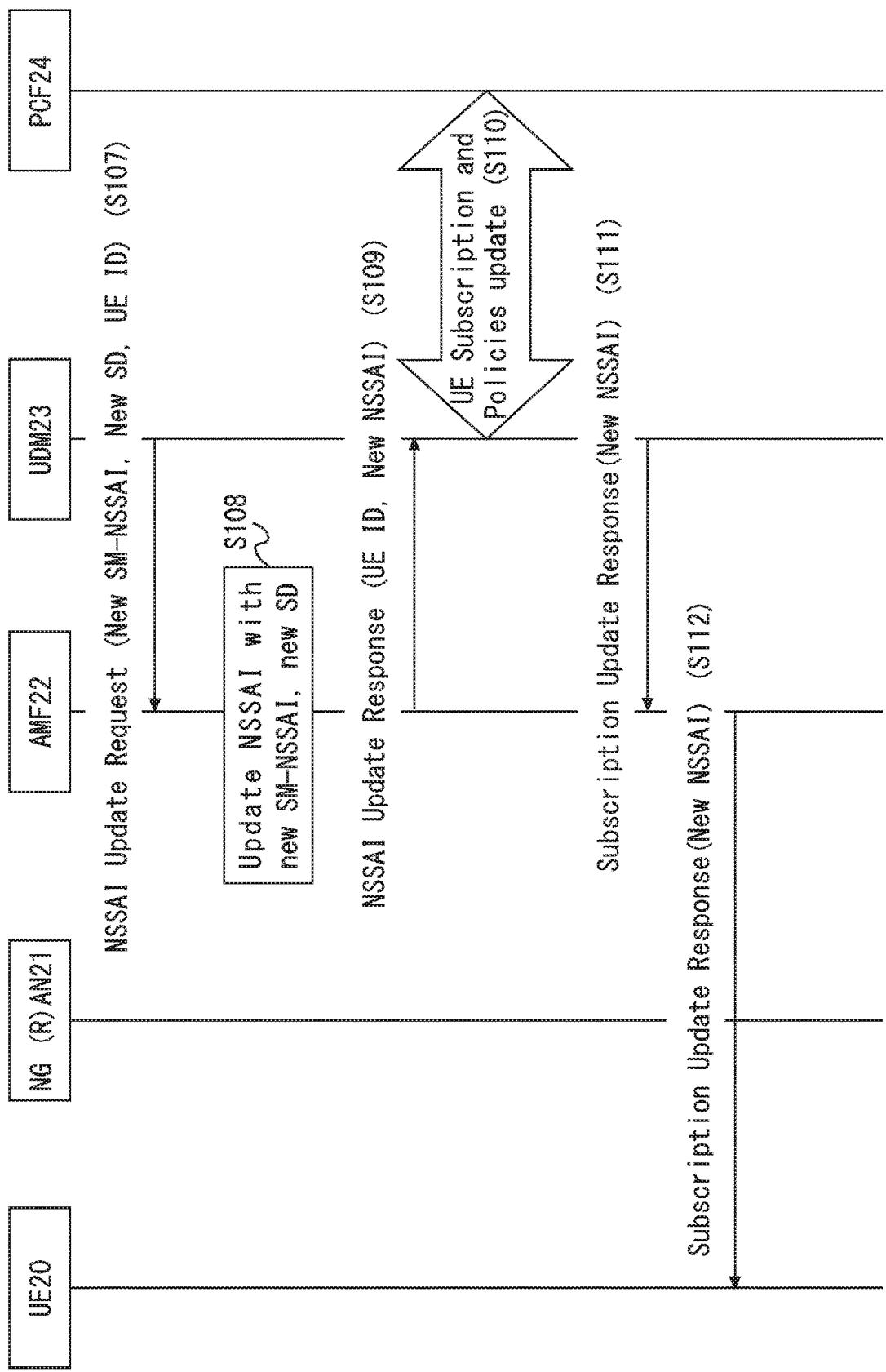
FIG. 14 shows a flow of an NSSAI updating process according to the third example embodiment.

Next, a flow of an NSSAI updating process-different from the one shown in FIGS. 11 and 12 is described with reference to FIGS. 13 and 14. In FIG. 13, the AMF 22 does not verify subscriber information of the UE 20 in a step S103 and the UDM 23 verifies the subscriber information of the UE 20 in a step S105. The other steps are similar to the steps S81 to S92 in FIGS. 11 and 12, and therefore detailed descriptions thereof are omitted.

Next, a flow of an NSSAI updating process different from the one shown in FIGS. 11 and 12 is described with reference to FIGS. 15 and 16. In a step S127 in FIG. 16, the UDM 23 sends an NSSAI Update Request message including an SST and a New SD to the AMF 22. That is, in a step S126, the UDM 23 updates the SD as the subscriber information of the UE 20.

Further, in a step S128, the AMF 22 updates the NSSAI, which is held in association with the UE 20, by using the New SD. The other steps are similar to the steps S81 and S92 in FIGS. 11 and 12, and therefore detailed descriptions thereof are omitted.

Figure 15:
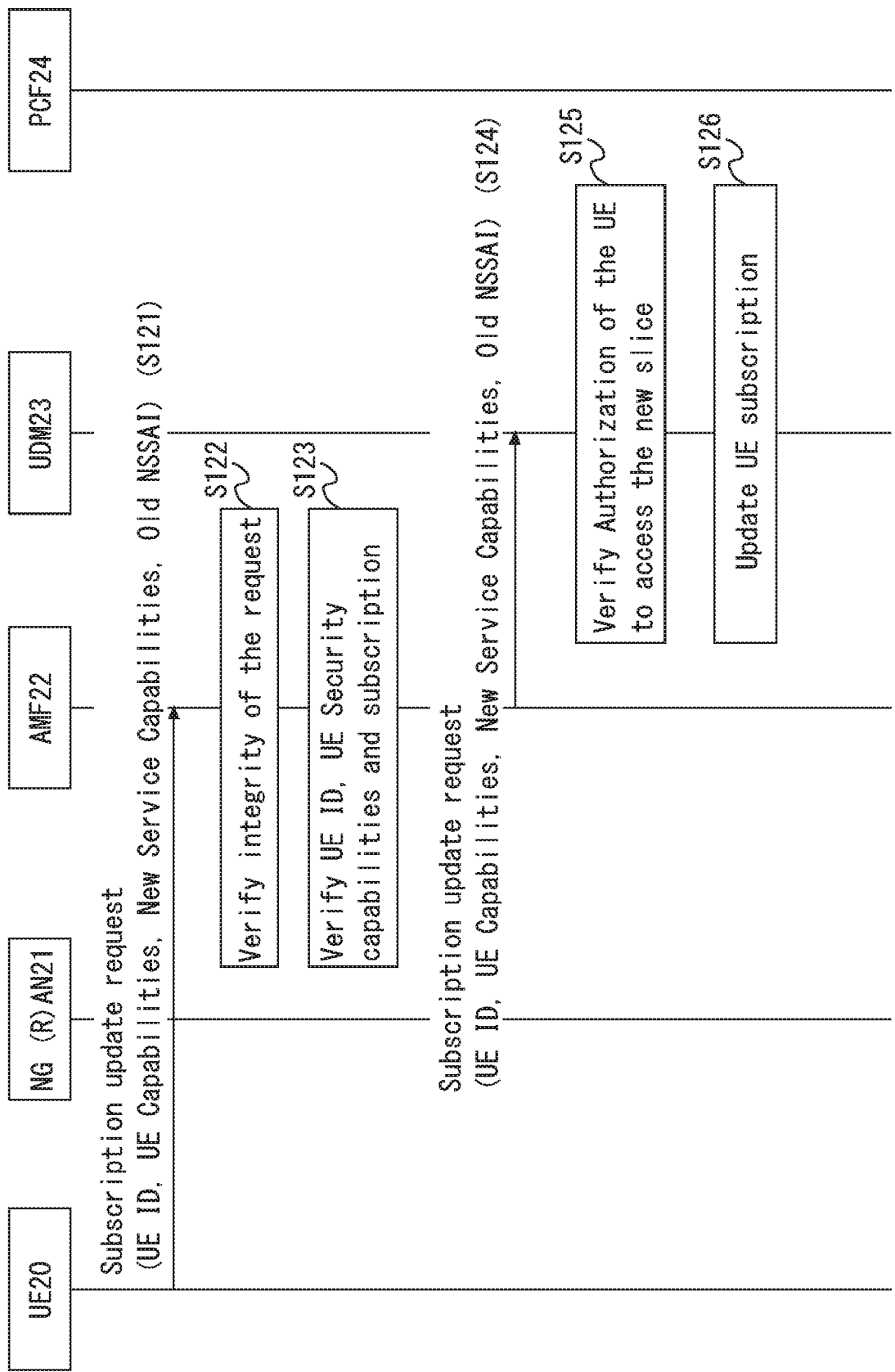
FIG. 15 shows a flow of an NSSAI updating process according to the third example embodiment.
Figure 16:
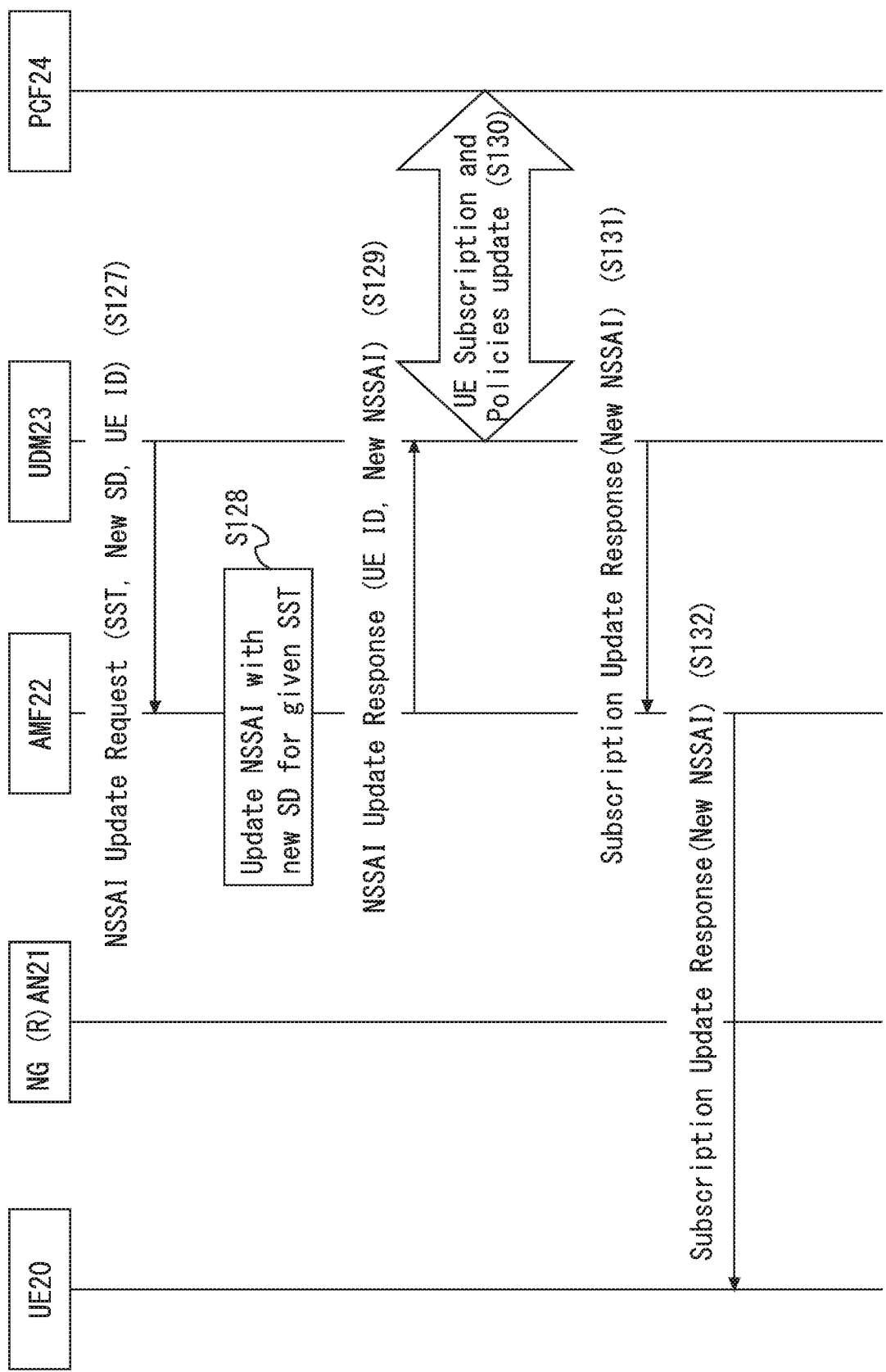
FIG. 16 shows a flow of an NSSAI updating process according to the third example embodiment.
Figure 17:
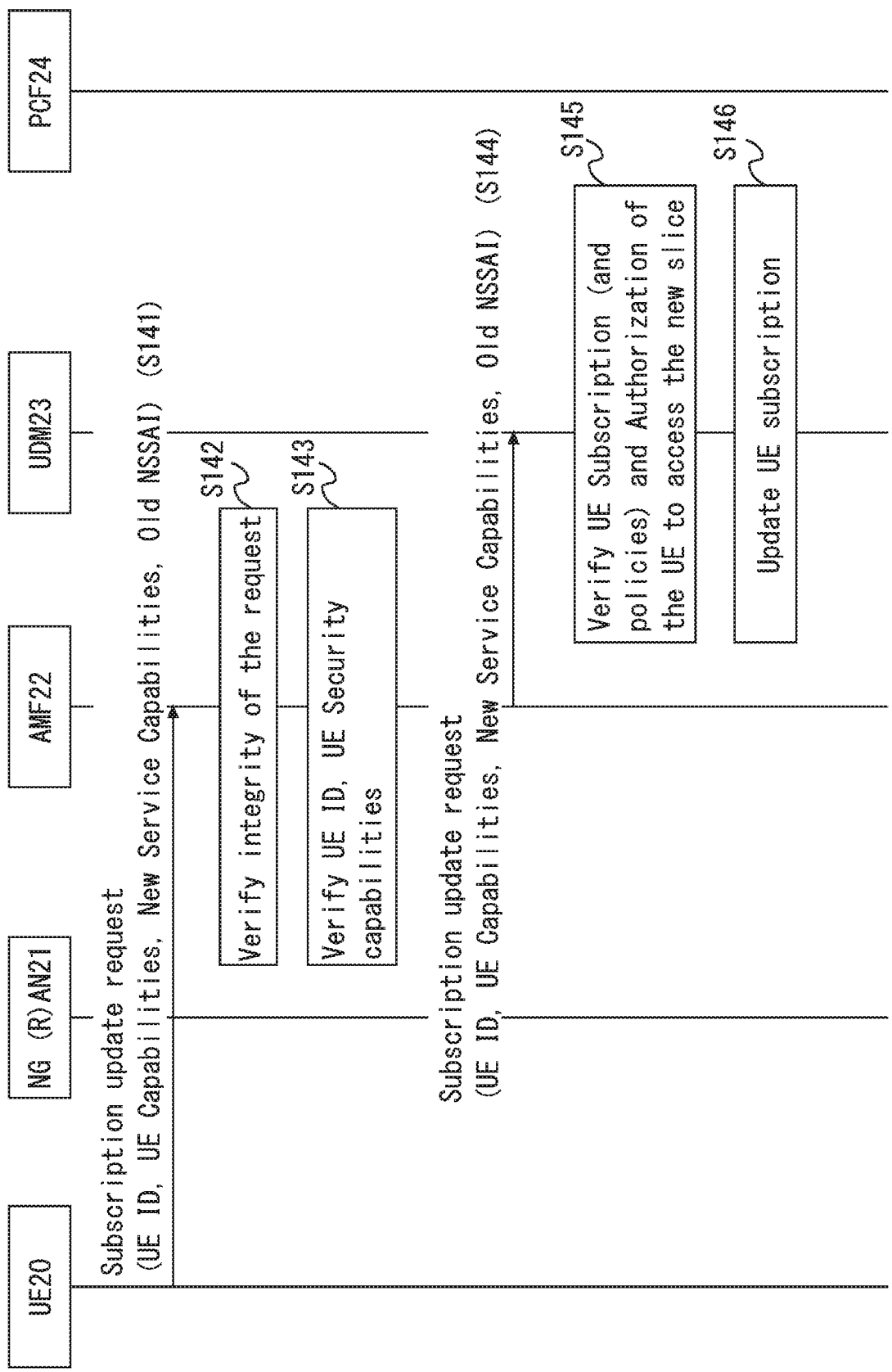
FIG. 17 shows a flow of an NSSAI updating process according to the third example embodiment.
Figure 18:
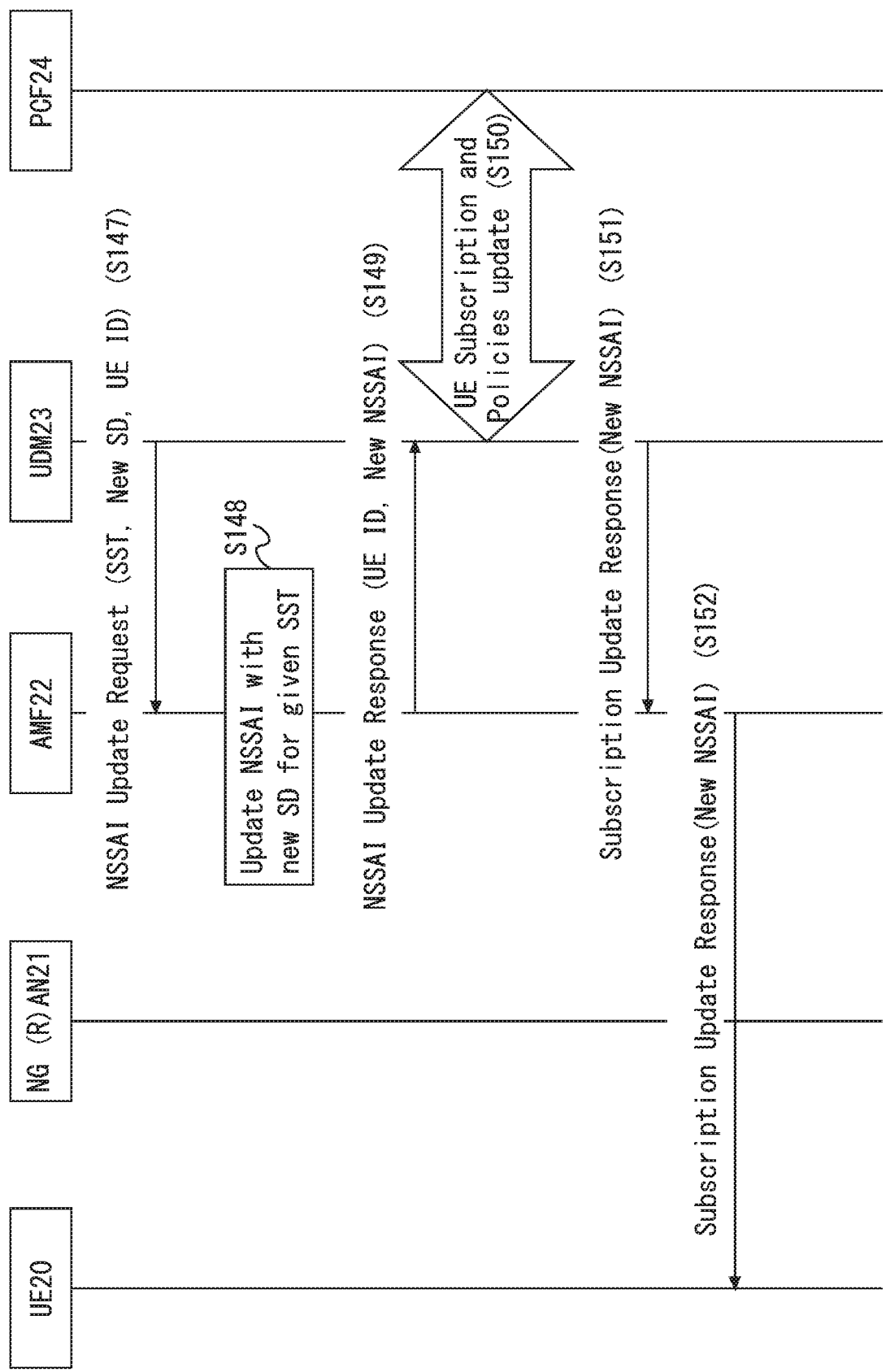
FIG. 18 shows a flow of an NSSAI updating process according to the third example embodiment.

Next, a flow of an NSSAI updating process different from the one shown in FIGS. 15 and 16 is described with reference to FIGS. 17 and 18. In FIG. 17, the AMF 22 does not verify subscriber information of the UE 20 in a step S143 and the UDM 23 verifies the subscriber information of the UE 20 in a step S145. The other steps are similar to the steps S121 to S132 in FIGS. 15 and 16, and therefore detailed descriptions thereof are omitted.

As described above, the AMF 22 can update the NSSAI, which is held in association with the UE 20, by performing the processes shown in FIGS. 11 to 18. Further, the UE 20 can receive the NSSAI that has been updated in the AMF 22. As a result, the UE 20 can update the NSSAI held in the UE 20 (i.e., the Old NSSAI).

Fourth Example Embodiment

Figure 19:
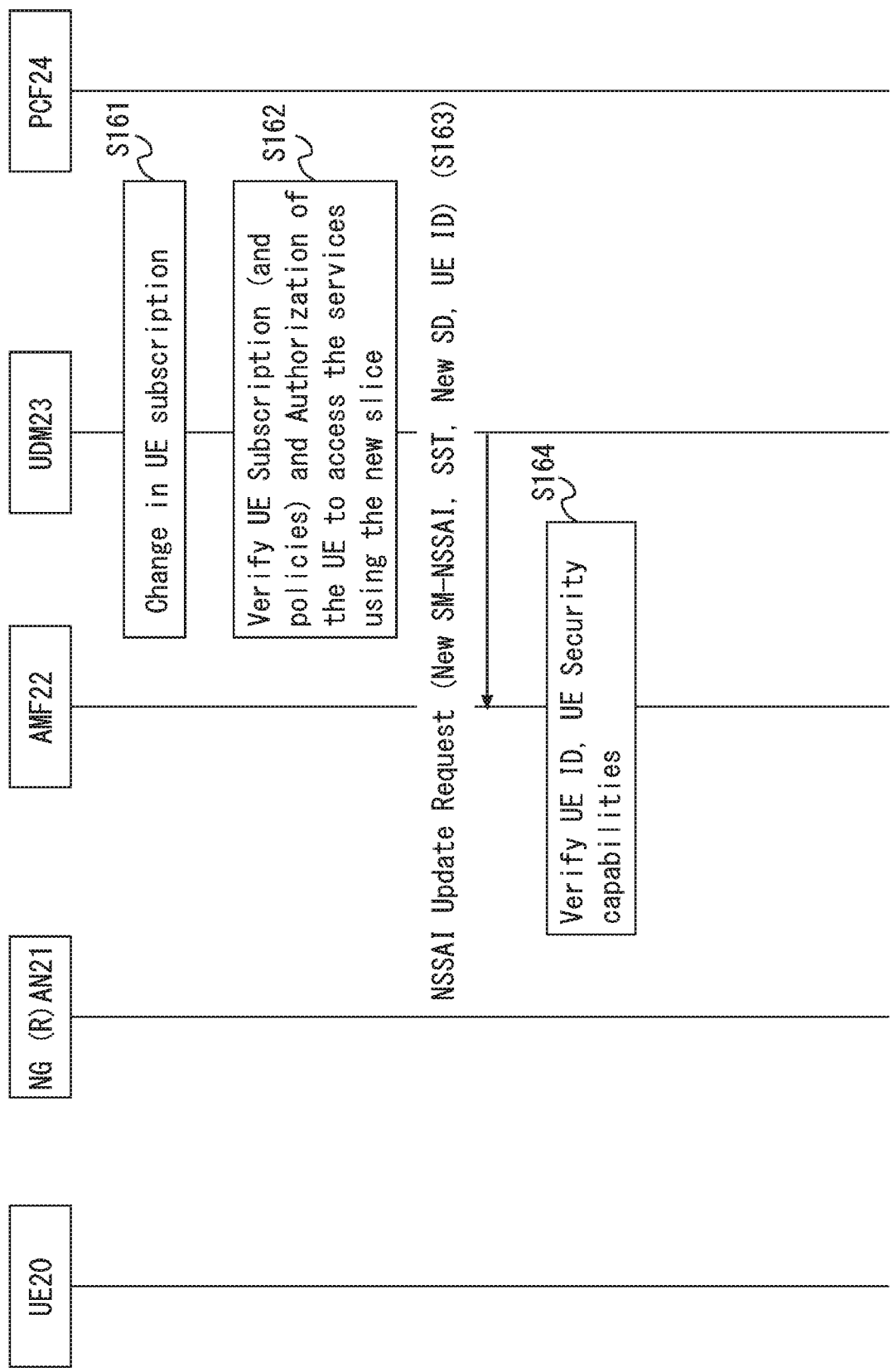
FIG. 19 shows a flow of an NSSAI updating process according to a fourth example embodiment.
Figure 20:
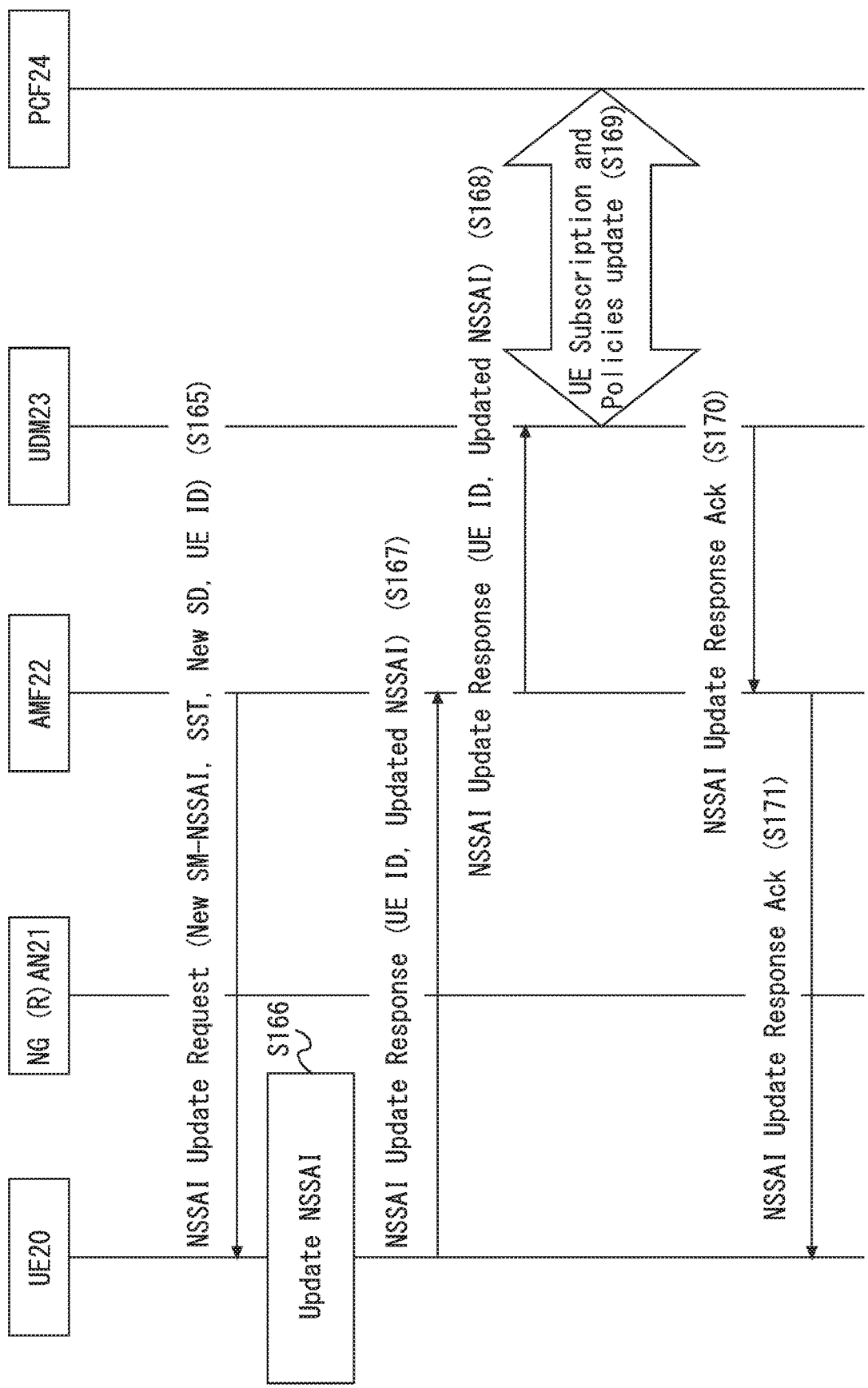
FIG. 20 shows a flow of an NSSAI updating process according to the fourth example embodiment.

Next, a flow of an NSSAI updating process is described with reference to FIGS. 19 and 20. FIGS. 19 and 20 show a process for updating NSSAI by using a process on the core network side as a trigger. Firstly, the UDM 23 changes subscriber information of the UE 20 (S161). Next, the UDM 23 determines whether or not the UE 20 can access to a newly generated (subscribed) network slice (S162). Further, the UDM 23 verifies the subscriber information of the UE 20 (S162).

Next, the UDM 23 sends an NSSAI Update Request message to the AMF 22 (S163). The NSSAI Update Request message includes New SM-NSSAI, an SST, a New SD, and a UE ID. Next, the AMF 22 verifies the UE ID and UE Security capabilities used to access the new network slice (S164). The AMF 22 may verify UE capabilities including the UE Security capabilities. Steps S165 to S171 are similar to the steps S8 to S14 in FIG. 3, and therefore detailed descriptions thereof are omitted. However, in the steps S170 and S171, an NSSAI Update Response Ack message is used instead of using the Subscription Update Response message.

Figure 21:
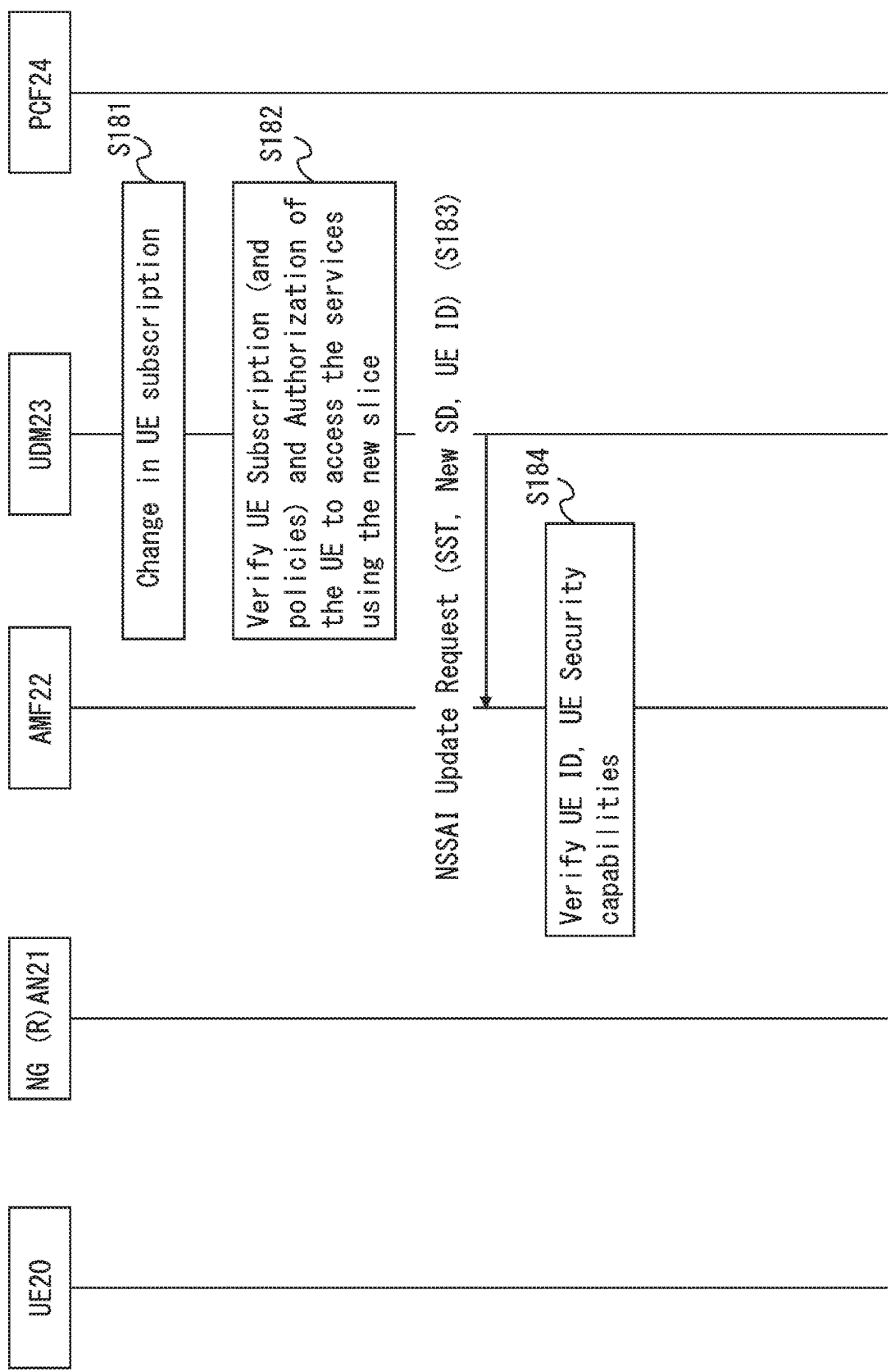
FIG. 21 shows a flow of an NSSAI updating process according to the fourth example embodiment.
Figure 22:
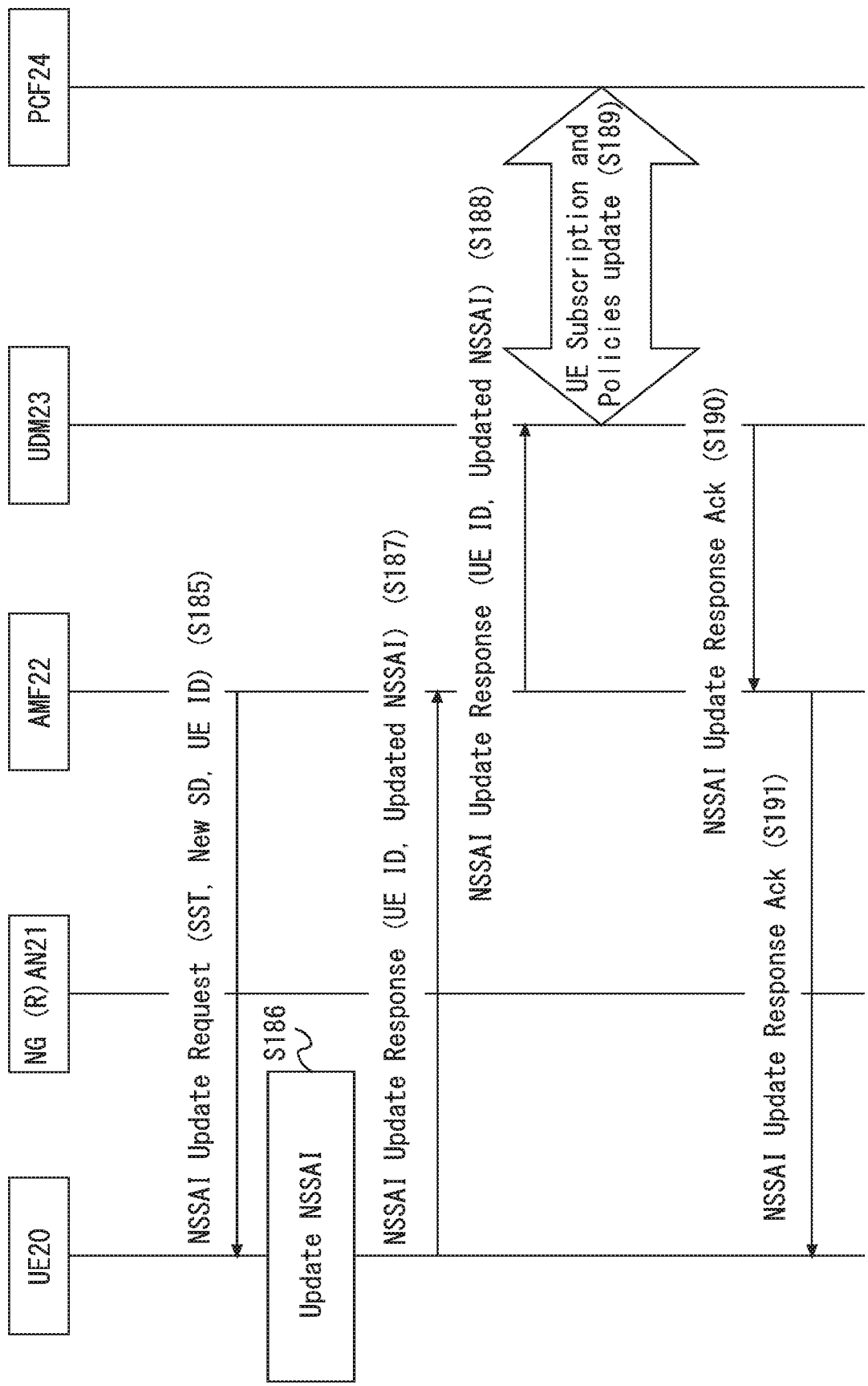
FIG. 22 shows a flow of an NSSAI updating process according to the fourth example embodiment.

Next, a flow of an NSSAI updating process different from the one shown in FIGS. 19 and 20 is described with reference to FIGS. 21 and 22. In FIG. 21, in a step S183, the UDM 23 sends an NSSAI Update Request message including an SST and a New SD to the AMF 22. That is, in a step S181, the UDM 23 changes the SD as the subscriber information of the UE 20.

Further, in a step S185, the AMF 22 forwards the NSSAI Update Request message received from the UDM 23 to the UE 20. In a step S186, the UE 20 updates the NSSAI held in the UE 20 by using the New SD. The other steps are similar to the steps S161 to S171 in FIGS. 19 and 20, and therefore detailed descriptions thereof are omitted.

Next, a flow of an NSSAI updating process different from the one shown in FIGS. 19 and 20 is described with reference to FIGS. 23 and 24. Steps S201 to S203 are similar to the steps S161 to S163 in FIG. 19, and therefore detailed descriptions thereof are omitted.

Next, the AMF 22 sends an NSSAI Request message to the UE 20 (S204). Next, the UE 20 sends an NSSAI Response message to the AWF 22 as a response message to the NSSAI Request message (S205). The NSSAI Response message includes Old NSSAI. Steps S204 and S205 may be omitted.

Steps S206 to S210 are similar to the steps S88 to S92 in FIG. 12, and therefore detailed descriptions thereof are omitted. However, in the steps S209 and S210, an NSSAI Update Response Ack message is used instead of using the Subscription Update Response message. Further, in a step S209, the UDM 23 may incorporate a UE ID into the NSSAI Update Response message. Further, if the UDM 23 has updated the NSSAI, which is held in association with the UE 20, after the step S202, the steps S203 to S207 may be skipped.

Figure 23:
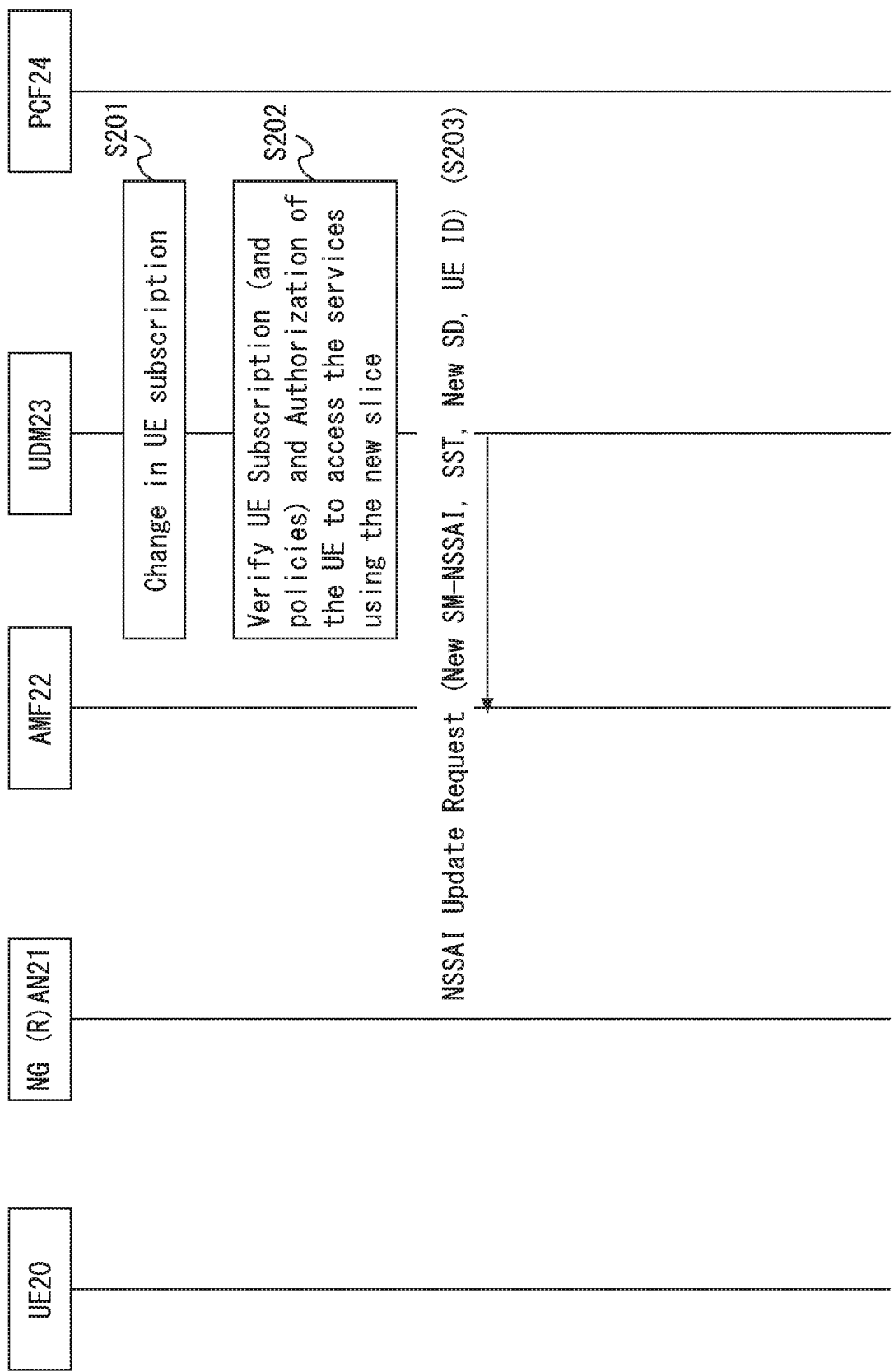
FIG. 23 shows a flow of an NSSAI updating process according to the fourth example embodiment.
Figure 24:
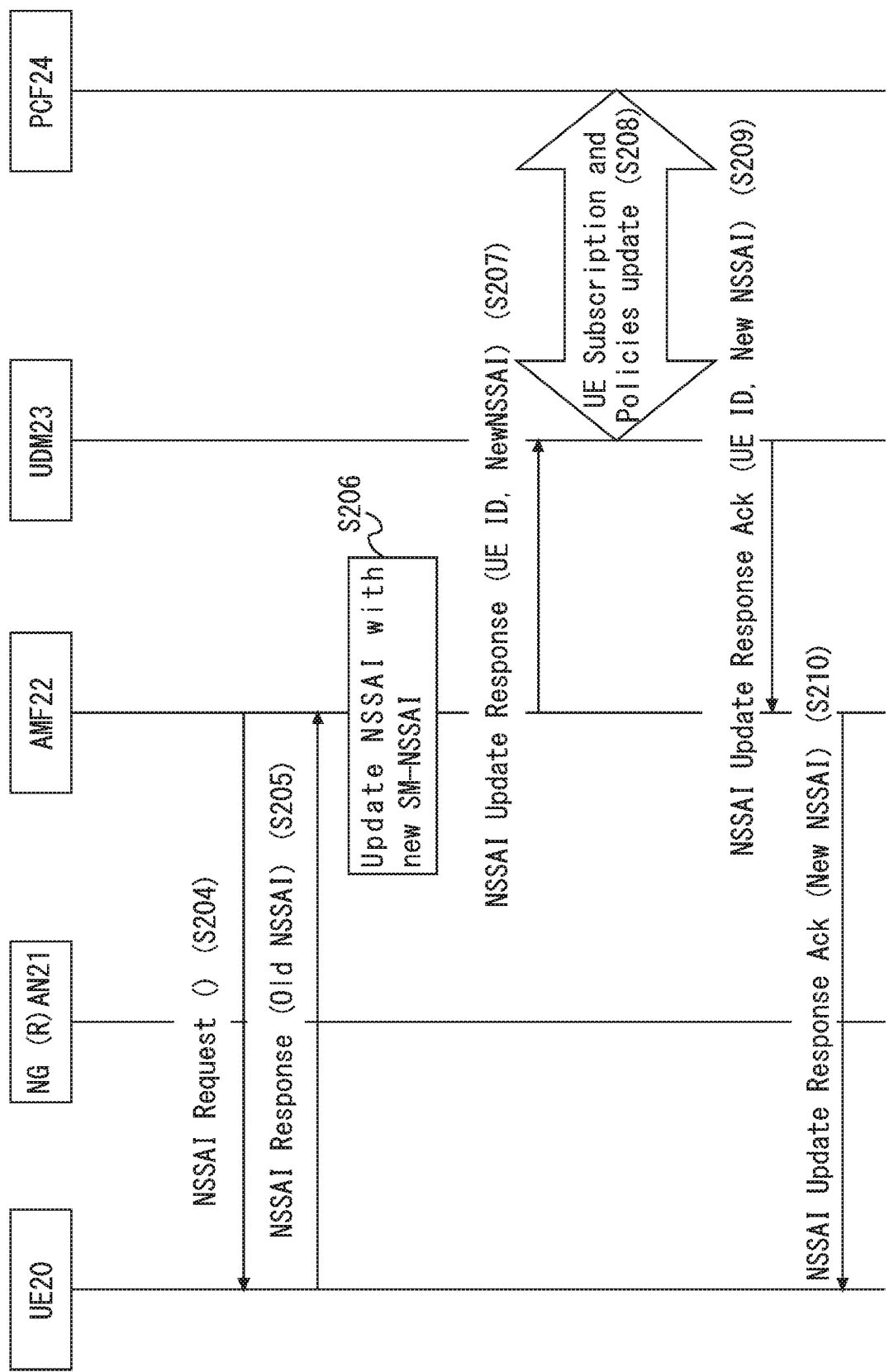
FIG. 24 shows a flow of an NSSAI updating process according to the fourth example embodiment.
Figure 25:
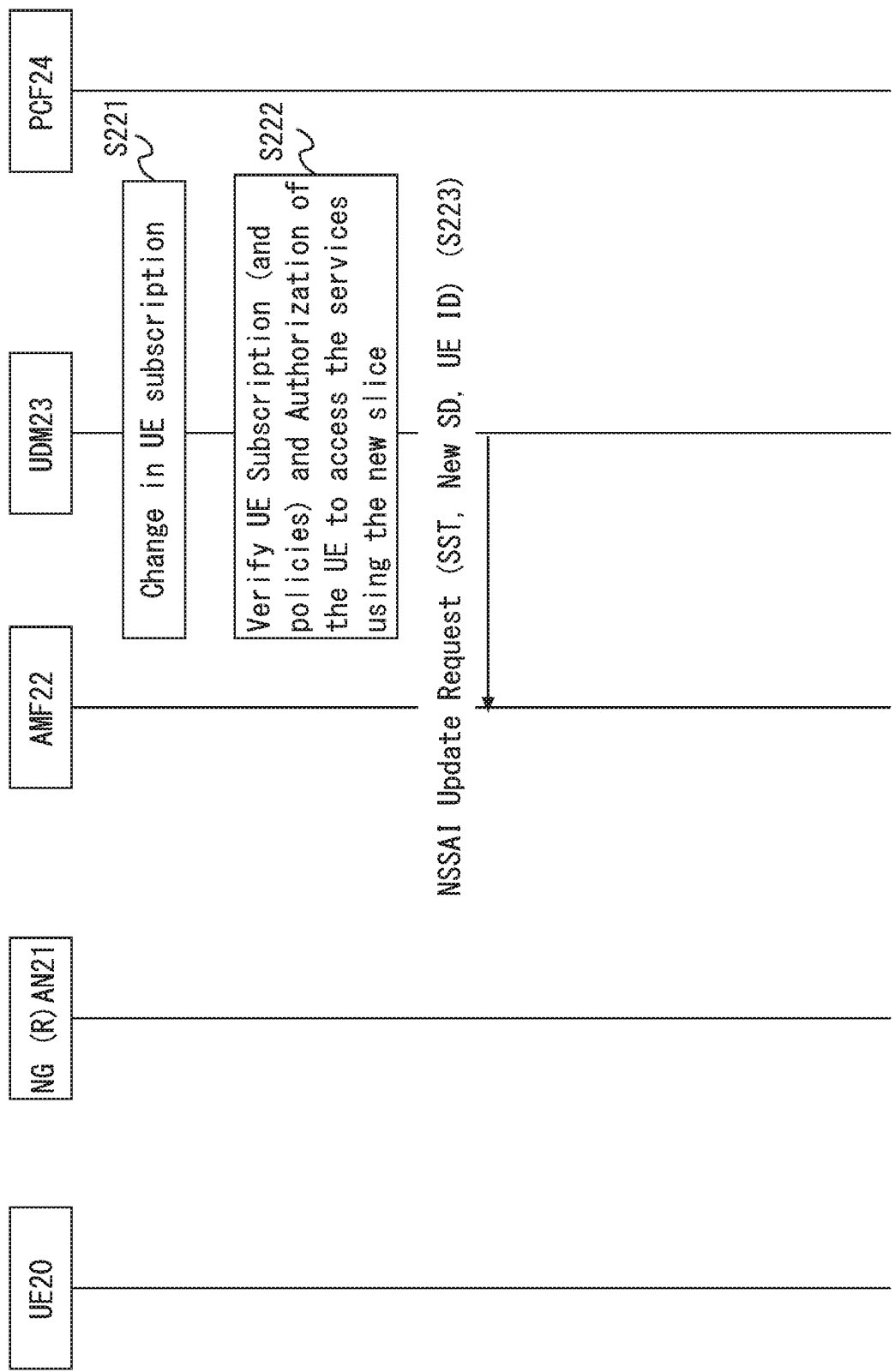
FIG. 25 shows a flow of an NSSAI updating process according to the fourth example embodiment.
Figure 26:
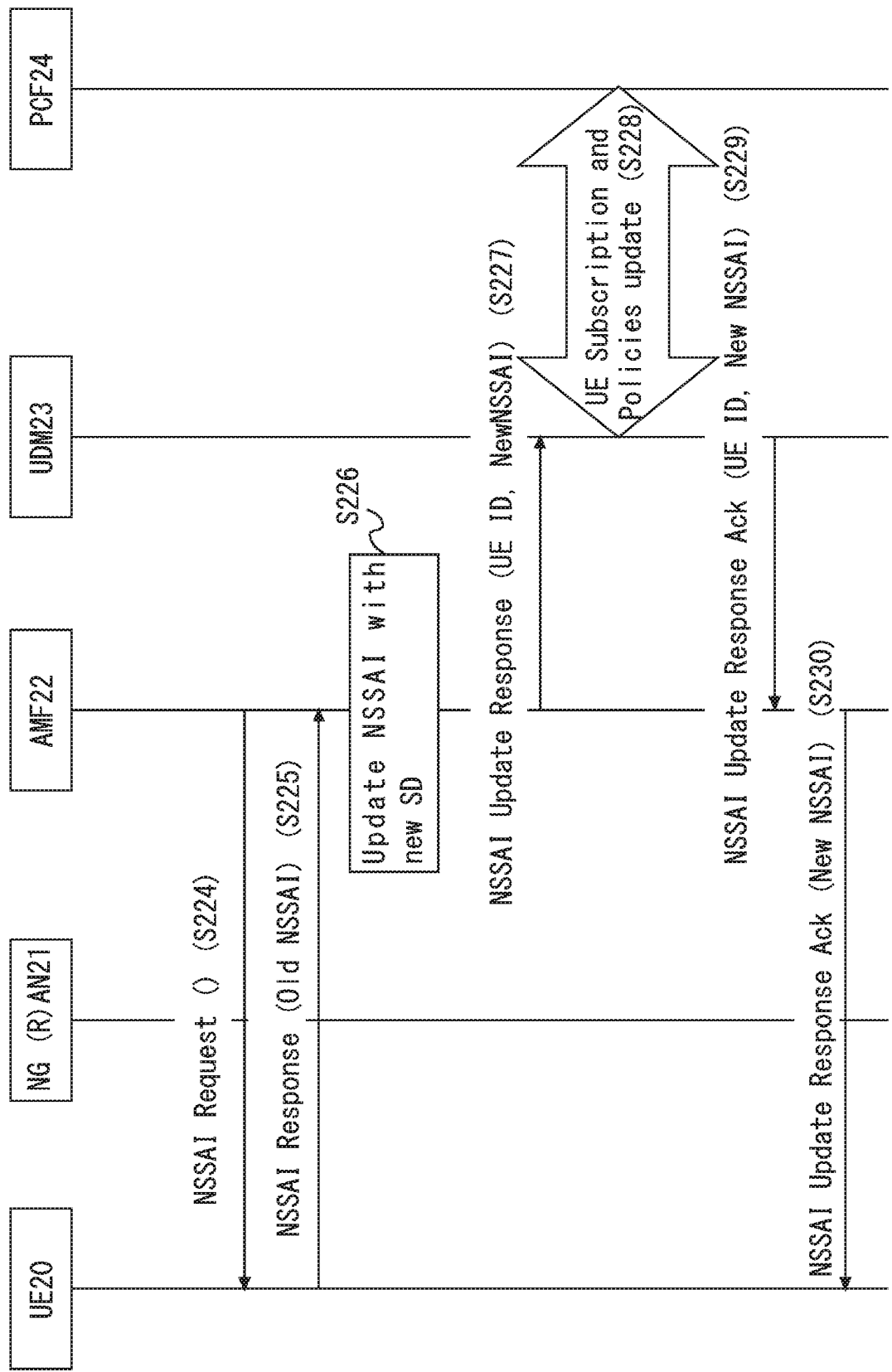
FIG. 26 shows a flow of an NSSAI updating process according to the fourth example embodiment.

Next, a flow of an NSSAI updating process different from the one shown in FIGS. 23 and 24 is described with reference to FIGS. 25 and 26. In FIG. 25, in a step S223, the UDM 23 sends an NSSAI Update Request message including an SST and a New SD to the AMF 22.

Further, in a step S226, the AMF 22 updates the NSSAI, which is held in association with the UE 20, by using the New SD. Steps S227 to S230 are similar to the steps S207 to S210 in FIG. 24, and therefore detailed descriptions thereof are omitted.

As described above, by performing the processes shown in FIGS. 19 to 26, the UE 20 or the AMF 22 can update the NSSAI, which is held in association with the UE 20, by using an occurrence of a change in the subscriber information in the UDM 23 as a trigger.

Fifth Example Embodiment

Figure 27:
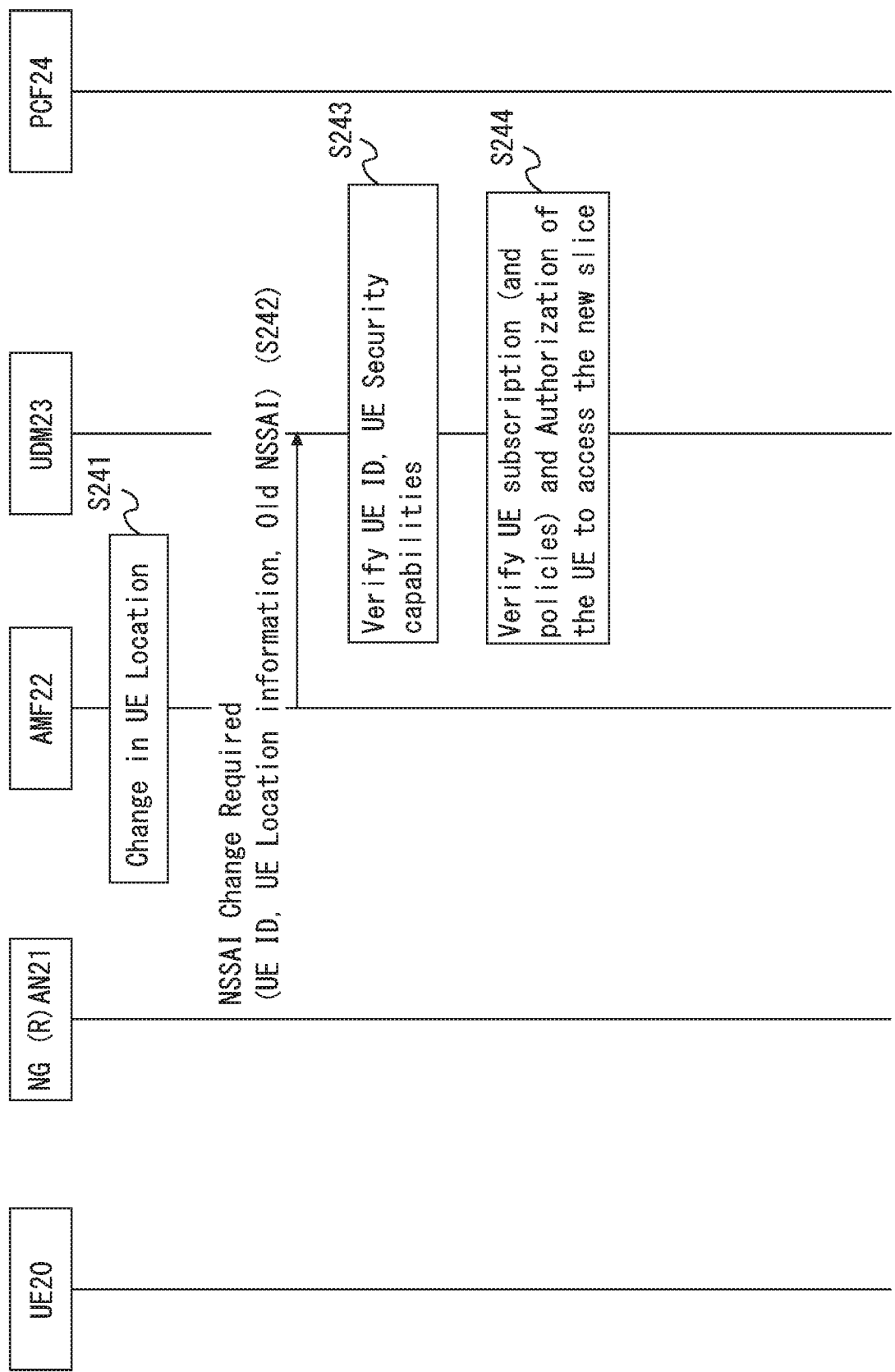
FIG. 27 shows a flow of an NSSAI updating process according to a fifth example embodiment.
Figure 28:
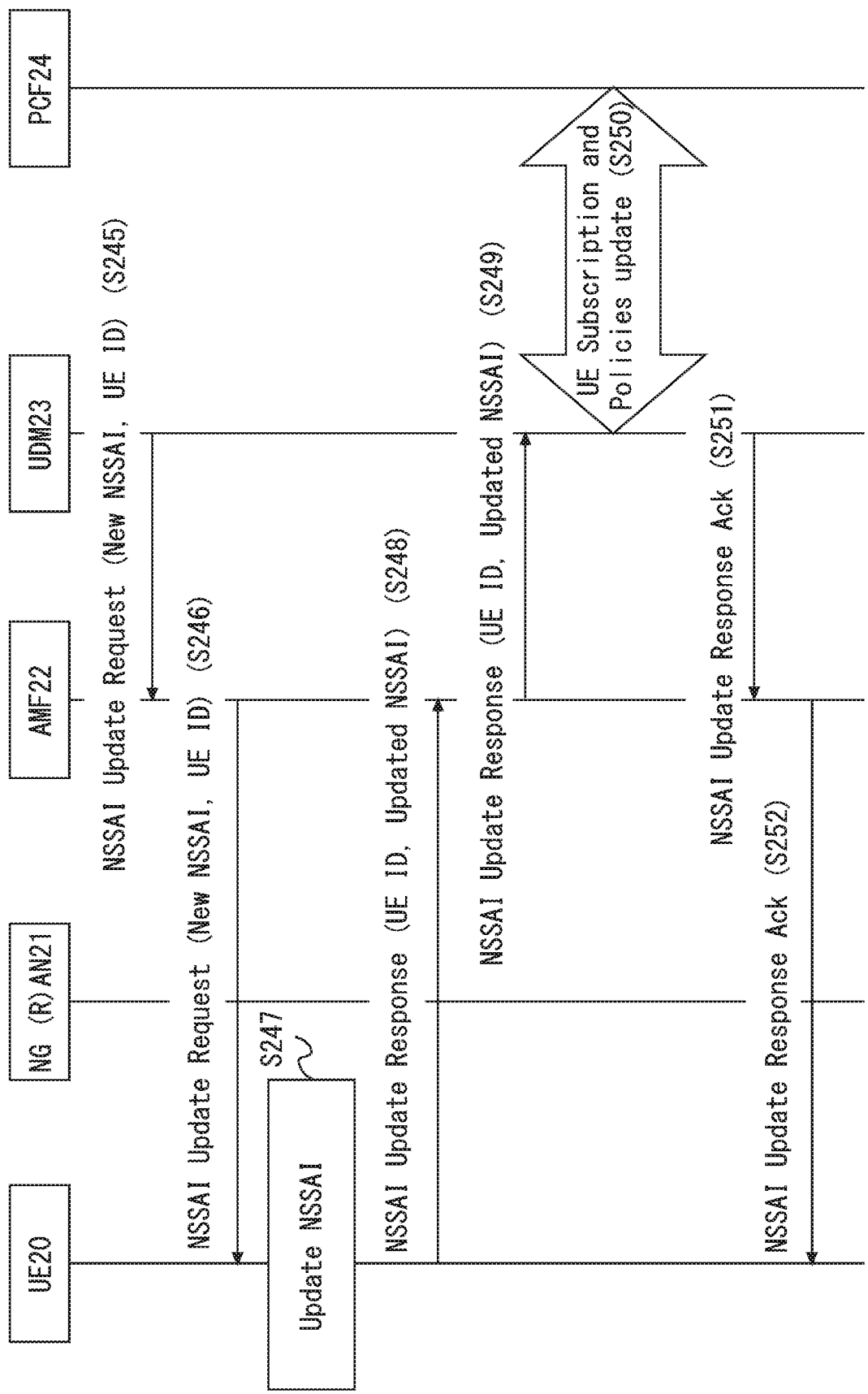
FIG. 28 shows a flow of an NSSAI updating process according to the fifth example embodiment.

Next, a flow of an NSSAI updating process is described with reference to FIGS. 27 and 28. Firstly, the AMF 22 detects that the location of the UE 20 has been changed (S241). Next, the AMF 22 sends an NSSAI Change Required message to the UDM 23 (S242). The NSSAI Change Required message includes a UE ID, UE Location information, and Old NSSAI of the UE 20.

Next, the UDM 23 verifies the UE ID and UE Security capabilities of the UE 20 that are used to access to a network slices in the destination of the UE 20 (S243). Further, the UDM 23 determines whether or not the UE 20 can access to the network slice which will be a new network slice to which the UE 20 will access (S244).

Next, the UDM 23 sends an NSSAI Update Request message to the AMP 22 (S245). The NSSAI Update Request message includes New NSSAI and a UE ID. Next, the AMP 22 forwards the received NSSAI Update Request message to the UE 20 (S246).

Next, the UE 20 updates the NSSAI in order to use at least one network slice provided in the destination (S247). Steps S248 to S252 are similar to the steps S167 to S171 in FIG. 20, and therefore detailed descriptions thereof are omitted.

Figure 29:
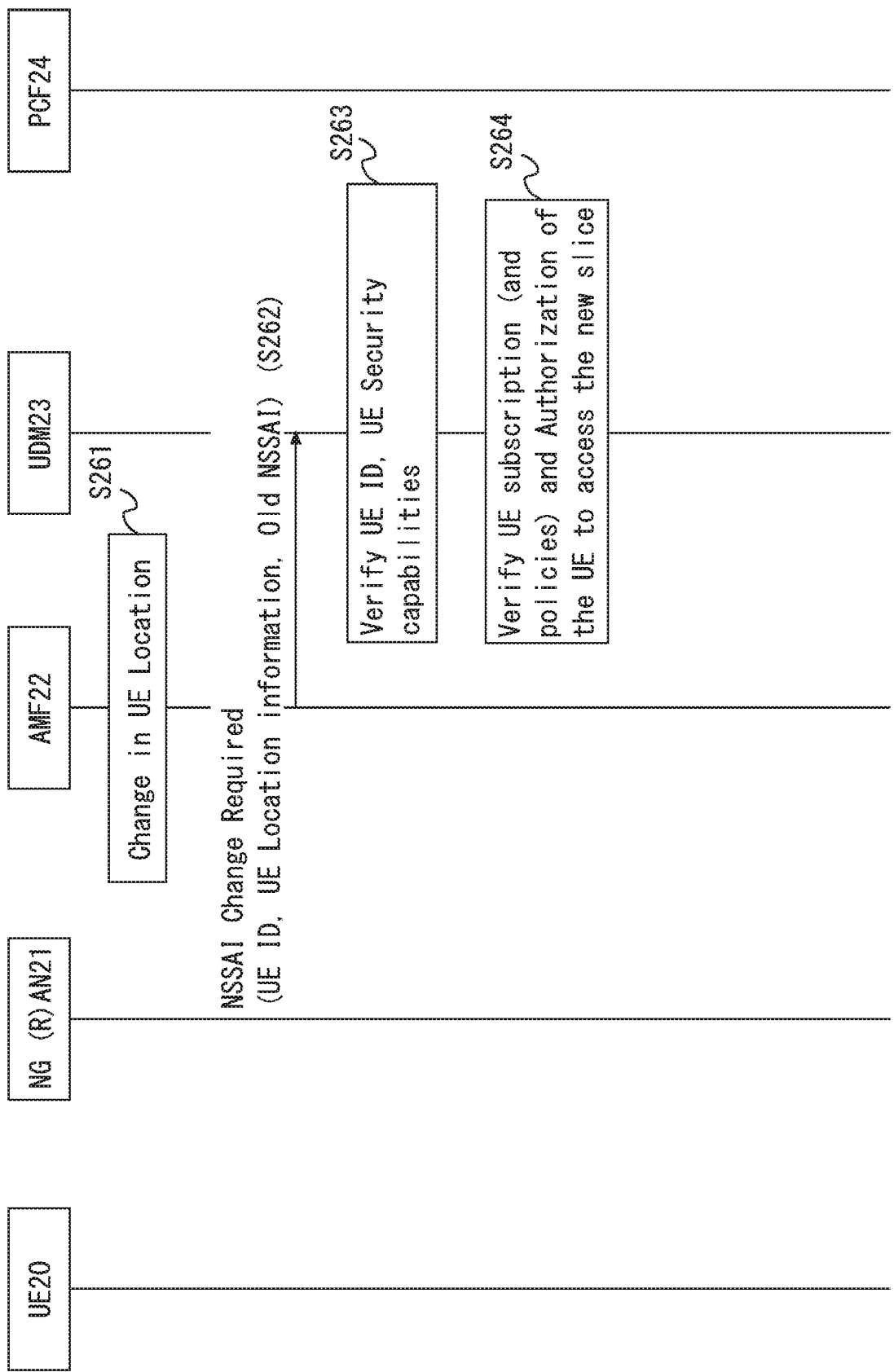
FIG. 29 shows a flow of an NSSAI updating process according to the fifth example embodiment.
Figure 30:
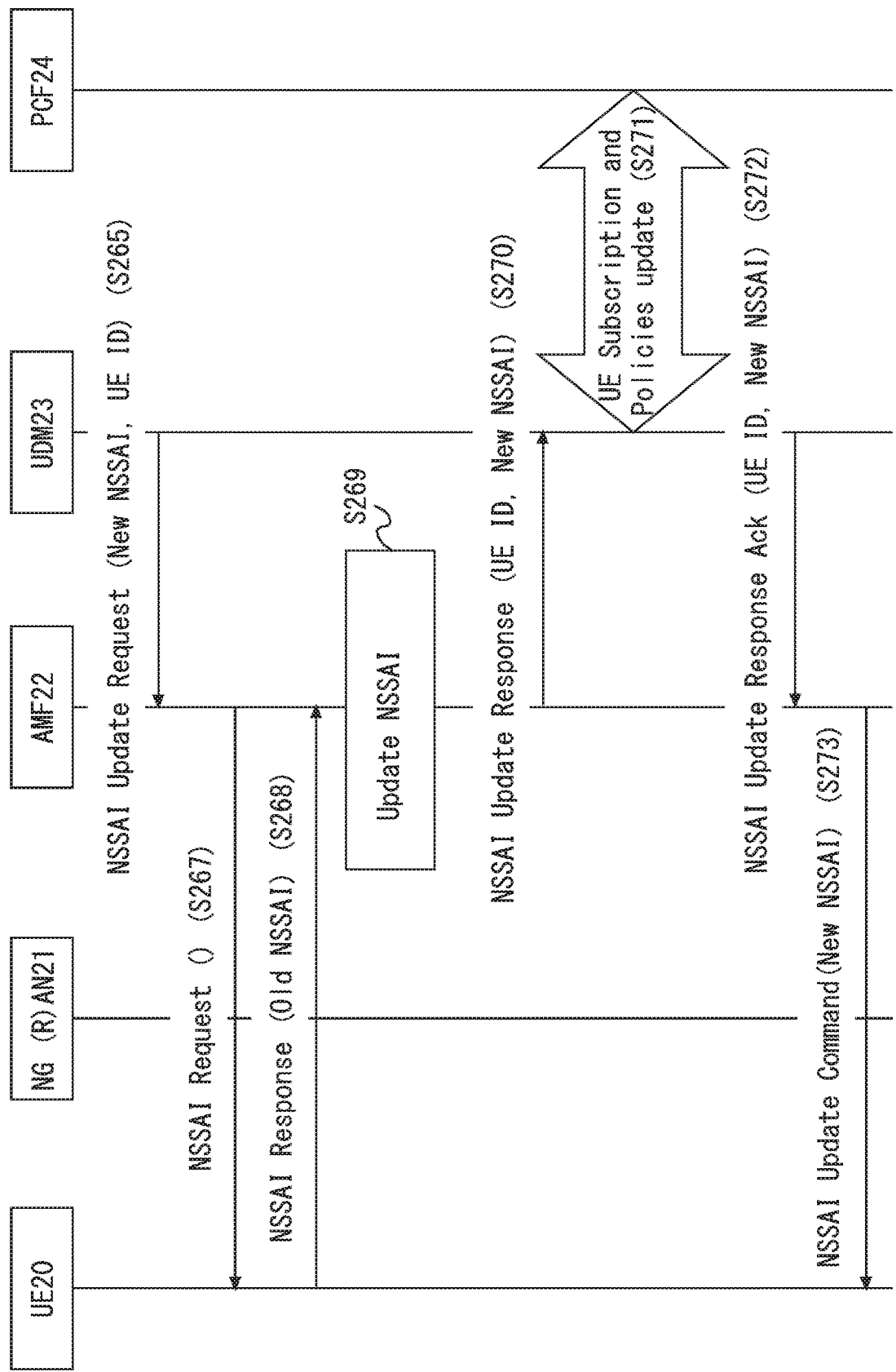
FIG. 30 shows a flow of an NSSAI updating process according to the fifth example embodiment.

Next, a flow of an NSSAI updating process is described with reference to FIGS. 29 and 30. Steps S261 to S265 are similar to the steps S241 to S245 in FIGS. 27 and 28, and therefore detailed descriptions thereof are omitted.

Next, the AMF 22 sends an NSSAI Request message to the UE 20 (S267). Next, the UP 20 sends an NSSAI Response message to the AMF 22 as a response message to the NSSAI Request message (S268). The NSSAI Response message includes Old NSSAI. Next, the AMP 22 updates the NSSAI in order to enable the UE 20 to use at least one network slice provided in the destination (S269). Steps S270 to S273 are similar to the steps S227 to S230 in FIG. 26, and thus detailed descriptions thereof are omitted.

As described above, by performing the processes shown in FIGS. 27 to 30, the UP, 20 or the AMP 22 can update the NSSAI, which is held in association with the UP 20, by using an occurrence of a change in the location information of the UE 20 in the AMF 22 as a trigger.

Next, configuration examples of the communication terminal 10 and the AMF 22 described in the above-shown plurality of example embodiments are described with reference to FIGS. 31 and 32.

Figure 31:
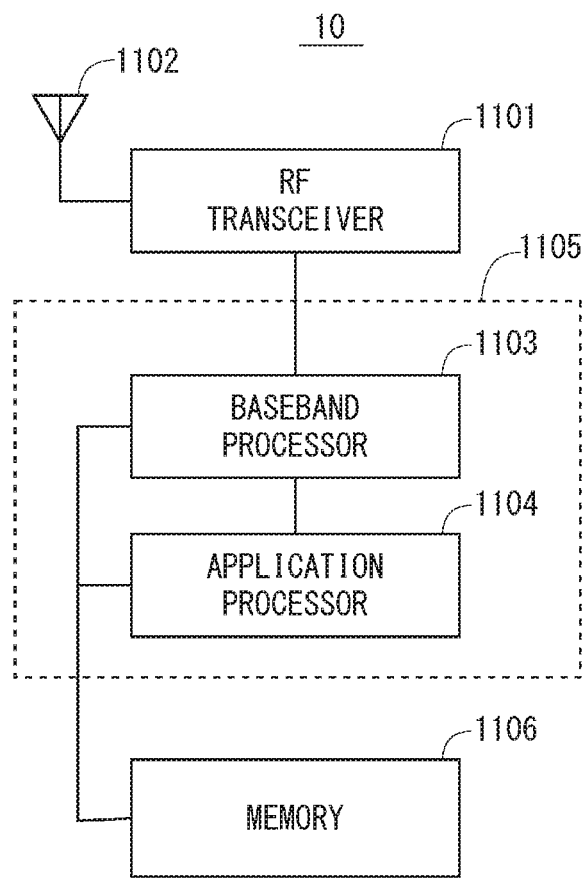
FIG. 31 is a configuration diagram of a communication terminal according to each example embodiment.

FIG. 31 is a block diagram showing a configuration example of the communication terminal 10. A Radio Frequency (RF) transceiver 1101 performs an analog RF signal processing to communicate with an eNB or a gNB. The analog RF signal processing performed by the RF transceiver 1101 includes a frequency up-conversion, a frequency down-conversion, and amplification. The RF transceiver 1101 is coupled to an antenna 1102 and a baseband processor 1103. That is, the RF transceiver 1101 receives modulated symbol data from the baseband processor 1103, generates a transmission RF signal, and supplies the generated transmission RF signal to the antenna 1102. The modulated symbol data may be OFDM (Orthogonal Frequency Division Multiplexing) symbol data. Further, the RF transceiver 1101 generates a baseband reception signal based on a reception RF signal received by the antenna 1102 and supplies the generated baseband reception signal to the baseband processor 1103.

The baseband processor 1103 performs digital baseband signal processing (i.e., data-plane processing) and control-plane processing for radio communication. The digital baseband signal processing includes (a) data compression/decompression, (b) data segmentation/concatenation, and (c) composition/decomposition of a transmission format (i.e., transmission frame). Further, the digital baseband signal processing includes (d) channel coding/decoding. Further, the digital baseband signal processing includes (e) modulation (i.e., symbol mapping)/demodulation and (f) generation of OFDM symbol data (i.e., baseband OFDM signal) by Inverse Fast Fourier Transform (IFFT). On the other hand, the control-plane processing includes communication management of layer 1 (e.g., transmission power control) and layer 2 (e.g., radio resource management and hybrid automatic repeat request (HARQ) processing). Further, the control-plane processing includes communication management of layer 3 (e.g., signaling regarding attach, mobility, and call management).

For example, in the case of LTE or LTE-Advanced, the digital baseband signal processing performed by the baseband processor 1103 may include signal processing of Packet Data Convergence Protocol (PDCP) layer. Further, digital baseband signal processing may include signal processing of Radio Link Control (RLC) layer, MAC layer, and PHY layer. Further, the control-plane processing performed by the baseband processor 1103 may include processing of Non-Access Stratum (NAS) protocol, RRC protocol, and MAC CE.

The baseband processor 1103 may include a modem processor (e.g., Digital Signal Processor (DSP)) that performs the digital baseband signal processing. Further, the baseband processor 1103 may include a protocol stack processor that performs the control-plane processing. The protocol stack processor may be, for example, a Central Processing Unit (CPU) or a Micro Processing Unit (MPU). In this case, the protocol stack processor, which performs the control-plane processing, may be integrated with an application processor 1104 described in the following.

The application processor 1104 may also be referred to as a CPU, an MPU, a microprocessor, or a processor core. The application processor 1104 may include a plurality of processors (processor cores). The application processor 1104 loads a system software program (Operating System (OS)) from a memory 1106 or from another memory (not shown). Further, the application processor implements various functions of the communication terminal 10 by executing various application programs. The application program may be, for example, a voice call application, a WEB browser, a mailer, a camera operation application, and a music player application.

In some implementations, as represented by a dashed line (1105) in FIG. 31, the baseband processor 1103 and the application processor 1104 may be integrated on a single chip. In other words, the baseband processor 1103 and the application processor 1104 may be implemented in a single System on Chip (SoC) device 1105. A SoC device may be referred to as a system Large Scale Integration (LSI) or a chipset.

The memory 1106 is a volatile memory, a nonvolatile memory, or a combination thereof. The memory 1106 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, or a hard disc drive. Alternatively, the nonvolatile memory may be any combination thereof. The memory 1106 may include, for example, an external memory device that can be accessed by the baseband processor 1103, the application processor 1104, and the SoC 1105. The memory 1106 may include an internal memory device that is integrated in the baseband processor 1103, the application processor 1104, or the SoC 1105. Further, the memory 1106 may include a memory in a Universal Integrated Circuit Card (UICC).

The memory 1106 may store software modules (computer programs) including instructions and data to perform processing by the communication terminal 10 described in the above example embodiments. In some implementations, the baseband processor 1103 or the application processor 1104 may be configured to load these software modules from the memory 1106 and execute the loaded software modules, thereby performing the processing of the communication terminal 10 described in the above example embodiments.

Figure 32:
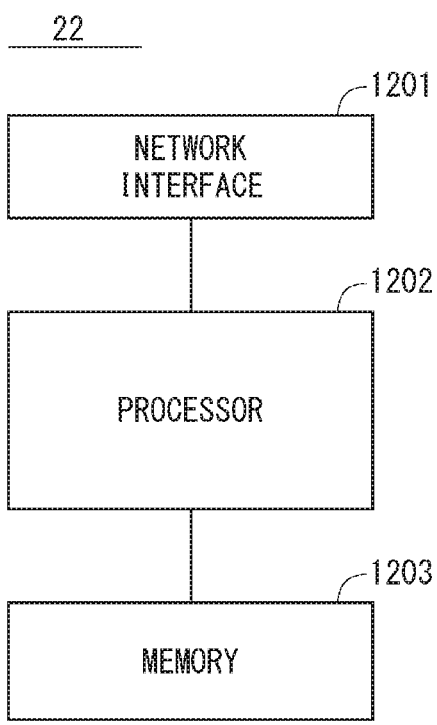
FIG. 32 is a configuration diagram of an AMF according to each example embodiment.

FIG. 32 is a block diagram showing a configuration example of the AMF 22. As shown in FIG. 32, the AMF 22 includes a network interface 1201, a processor 1202, and a memory 1203. The network interface 1201 is used to communicate with other network node apparatuses constituting the communication system. The network interface 1201 may include, for example, a network interface card (NIC) conforming to the IEEE 802.3 series.

The processor 1202 loads software (i.e., computer program(s)) from the memory 1203 and executes the loaded software, thereby performing processing of the AMP 22 described in the above example embodiments. The processor 1202 may be, for example, a microprocessor, an MPU (Micro Processing Unit), or a CPU (Central Processing Unit). The processor 1202 may include a plurality of processors.

The memory 1203 is composed of any combination of a volatile memory and a nonvolatile memory. The memory 1203 may include a storage located apart from the processor 1202. In this case, the processor 1202 may access the memory 1203 through an I/O interface (not shown).

In the example shown in FIG. 32, the memory 1203 is used to store a group of software modules. The processor 1202 loads the group of software modules from the memory 1203 and executes the loaded software modules, thereby performing the processing of the AMF 22 described by in the above example embodiments.

As described above with reference to FIG. 32, the processor included in the AMF 22 may be configured to execute one or a plurality of programs including a set of instructions to cause a computer to perform an algorithm described above with reference to the drawings.

In the above-described examples, the programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive) and a magneto-optic recording medium (such as a magneto-optic disk). Further, examples of the non-transitory computer readable media include CD-ROM (Read Only Memory), CD-R, and CD-R/W. Further, examples of the non-transitory computer readable media include a semiconductor memory. The semiconductor memory includes, for example, a mask ROM, a PROM (Programmable ROM), an EPROM (Erasable PROM), a flash ROM, and a RAM (Random Access Memory). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Note that the present disclosure is not limited to the above-described example embodiments and can be modified as appropriate without departing from the spirit and scope of the present disclosure. Further, the present disclosure may be implemented by combining these example embodiments as desired.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

This application is based upon and claims the benefit of priority from Indian patent application No. 201711003072, filed on Jan. 27, 2017, the disclosure of which is incorporated herein in its entirety by reference.

The whole or part of the example embodiments disclosed above can be described as, but not limited to, the following supplementary notes.

(Supplementary Note 1)

A communication terminal managed in a core network, comprising:

a communication unit configured to receive a parameter related to SM-NSSAI (Session Management-Network Slice Selection Assistance Information) from the core network when subscriber information of the communication terminal itself or a location of the communication terminal itself is changed; and a control unit configured to update NSSAI by using the parameter related to the SM-NSSAI, the NSSAI being managed to select a network slice.

(Supplementary Note 2)

The communication terminal described in Supplementary note 1, wherein the communication unit receives a parameter indicating new SM-NSSAI, and the control unit updates the NSSAI by using the parameter indicating the new SM-NSSAI.

(Supplementary Note 3)

The communication terminal described in Supplementary note 1 or 2, wherein the communication unit receives a new SD (Slice Differentiator) included in the SM-NSSAI, and the control unit updates the NSSAI by using the parameter indicating the new SD.

(Supplementary Note 4)

The communication terminal described in any one of Supplementary notes 1 to 3, wherein the communication unit sends a request message requesting a change of subscriber information of the communication terminal itself to the core network.

(Supplementary Note 5)

The communication terminal described in Supplementary note 4, wherein the request message includes a parameter related to a new network slice or a new service that the communication terminal itself desires to subscribe.

(Supplementary Note 6)

The communication terminal described in any one of Supplementary notes 1 to 5, wherein the communication unit receives an NSSAI Update Request message including the parameter related to the SM-NSSAI.

(Supplementary Note 7)

A core network apparatus comprising:

a communication unit configured to receive a parameter related to SM-NSSAI (Session Management-Network Slice Selection Assistance Information) from a subscriber information management apparatus when subscriber information of a communication terminal managed in the subscriber information management apparatus or a location of the communication terminal is changed; and a control unit configured to update NSSAI by using information related to the SM-NSSAI, the NSSAI being managed to select a network slice used by the communication terminal.

(Supplementary Note 8)

The core network apparatus described in Supplementary note 7, wherein the communication unit receives a parameter indicating new SM-NSSAI, and the control unit updates the NSSAI by using the parameter indicating the new SM-NSSAI.

(Supplementary Note 9)

The core network apparatus described in Supplementary note 7 or 8, wherein the communication unit receives a new SD (Slice Differentiator) included in the SM-NSSAI, and the control unit updates the NSSAI by using the parameter indicating the new SD.

(Supplementary Note 10)

A communication system comprising:

a subscriber information management apparatus configured to send a parameter related to SM-NSSAI (Session Management-Network Slice Selection Assistance Information) to a communication terminal when subscriber information of the communication terminal or a location of the communication terminal is changed; and the communication terminal configured to receive the parameter related to the SM-NSSAI and update NSSAI by using the parameter related to the SM-NSSAI, the NSSAI being managed to select a network slice.

(Supplementary Note 11)

The communication system described in Supplementary note 10, wherein the subscriber information management apparatus sends a parameter indicating new SM-NSSAI, and the communication terminal updates the NSSAI by using the parameter indicating the new SM-NSSAI.

(Supplementary Note 12)

The communication system described in Supplementary note 10 or 11, wherein the subscriber information management apparatus sends a new SD (Slice Differentiator) included in the SM-NSSAI, and the communication terminal updates the NSSAI by using the parameter indicating the new SD.

(Supplementary Note 13)

An information management method for a communication terminal managed in a core network, comprising:

receiving a parameter related to SM-NSSAI (Session Management-Network Slice Selection Assistance Information) from the core network when subscriber information of the communication terminal or a location of the communication terminal is changed; and updating NSSAI by using the parameter related to the SM-NSSAI, the NSSAI being managed to select a network slice.

(Supplementary Note 14)

A program for causing a computer to:

receive a parameter related to SM-NSSAI (Session Management-Network Slice Selection Assistance Information) from a core network when subscriber information of the communication terminal managed in the core network or a location of the communication terminal is changed; and update NSSAI by using the parameter related to the SM-NSSAI, the NSSAI being managed to select a network slice.

REFERENCE SIGNS LIST

10 COMMUNICATION TERMINAL
11 COMMUNICATION UNIT
12 CONTROL UNIT
20 UE
21 NG (R)AN
22 AMF
23 UDM
24 PCF
31 COMMUNICATION UNIT
32 CONTROL UNIT

The invention claimed is:

1. A communication terminal operating as a User Equipment (UE), the communication terminal comprising:
   at least one memory; and
   at least one processor, comprising hardware, configured to:
      receive, from a core network apparatus, a first parameter of Network Slice Selection Assistance Information (NSSAI) which is comprised of a Slice Differentiator (SD);
      update configuration related to a Network Slice based on the received first parameter of NSSAI; and receive, from the core network apparatus, a second parameter related to a UE policy after an update of the UE policy in an another core network apparatus, wherein the core network apparatus receives, from the another core network apparatus, after the update of the UE policy in the another core network apparatus, the second parameter.

2. The communication terminal according to claim 1, wherein the at least one processor is further configured to:
send an acknowledge message to the core network apparatus, after the updates of the configuration related to the Network Slice.

3. A first core network apparatus comprising:
at least one memory; and
at least one processor, comprising hardware, configured to:
send, to a communication terminal operating as a User Equipment (UE), a first message which contains a first parameter of Network Slice Selection Assistance Information (NSSAI) which is comprised of a Slice Differentiator (SD) based on subscription changes by a second core network apparatus which supports subscription management or the UE mobility;
receive, from the UE, a second message for the first message; and
receive, from a third core network apparatus, after an update of a UE policy in the third core network apparatus, a third message related to the updated UE policy.

4. The core network apparatus according to claim 3, wherein the at least one processor is further configured to:
send an acknowledge message to the second core network apparatus, after updates of a UE configuration related to the Network Slice.

5. The first core network apparatus according to claim 3, wherein the at least one processor is further configured to:
send the third message to the UE, after the update of the UE policy in the third core network apparatus.

6. A method for a communication terminal operating as a User Equipment (UE), the method comprising:

receiving, from a core network apparatus, a first parameter of Network Slice Selection Assistance Information (NSSAI) which is comprised of a Slice Differentiator (SD);
updating configuration related to a Network Slice based on the received first parameter of NSSAI; and
receiving, from the core network apparatus, a second parameter related to a UE policy after an update of the UE policy in an another core network apparatus, wherein the core network apparatus receives, from the another core network apparatus, after the update of the UE policy in the another core network apparatus, the second parameter.

7. The method according to claim 6 further configured to:
sending an acknowledge message to the core network apparatus, after the updates of configuration related to the Network Slice.

8. A method for a first core network apparatus, the method comprising:
sending, to a communication terminal operating as a Use Equipment (UE), a first message which contains a first parameter of Network Slice Selection Assistance Information (NSSAI) which is comprised of a Slice Differentiator (SD) based on subscription changes by a second core network apparatus which supports subscription management or the UE mobility;
receiving, from the UE, a second message for the first message; and
receiving, from a third core network apparatus (PCF), after an update of a UE policy in the third core network apparatus (PCR), a third message related to the UE policy.

9. The method according to claim 8, wherein the at least one processor is further configured to:
sending an acknowledge message to the second core network apparatus after updates of a UE configuration related to Network Slice.

10. The method according to claim 8, wherein the at least one processor is further configured to:
sending the third message to the UE, after the update of the UE policy in the third core network apparatus.

* * * * *